(12) United States Patent
Ito

(10) Patent No.: US 6,563,507 B1
(45) Date of Patent: *May 13, 2003

(54) STORAGE CIRCUIT CONTROL DEVICE AND GRAPHIC COMPUTATION DEVICE

(75) Inventor: Takeshi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,949

(22) Filed: Sep. 22, 1999

(51) Int. Cl.[7] .............................................. G06F 12/10
(52) U.S. Cl. ...................... 345/569; 345/653; 345/654; 345/656
(58) Field of Search ................................ 345/569, 653, 345/654, 656

(56) References Cited

U.S. PATENT DOCUMENTS

| | | | | |
|---|---|---|---|---|
| 4,325,075 A | * | 4/1982 | Kashigi et al. ............. | 348/514 |
| 4,885,699 A | * | 12/1989 | Taoda et al. | |
| 5,193,126 A | * | 3/1993 | Matsuki ..................... | 382/293 |
| 5,210,822 A | * | 5/1993 | Tsuchiya et al. ............ | 395/115 |
| 5,241,626 A | * | 8/1993 | Taoda .......................... | 395/516 |
| 5,422,997 A | * | 6/1995 | Nagashima ................. | 345/516 |

* cited by examiner

Primary Examiner—Matthew C. Bella
Assistant Examiner—Mackly Monestime
(74) Attorney, Agent, or Firm—Fulwider Patton Lee & Utecht, LLP

(57) ABSTRACT

Texture data containing pixel data indicating the color of a plurality of pixels arrayed in matrix fashion are stored in a texture buffer of a DRAM, and the multiple pixel data stored in the texture buffer is simultaneously accessed using a two-dimensional address (U, V) corresponding to the two-dimensional array of the plurality of pixels. The texture buffer stipulates unit blocks containing multiple pixel data to be simultaneously accessed, and stores a plurality of unit blocks making up texture data so as to be continuously positioned within a one-dimensional address space. Accordingly, the storage area of the texture buffer can be used efficiently, and further, simultaneous processing of image data of multiple pixels can be realized.

20 Claims, 14 Drawing Sheets

FIG. 10

|   | U → | | | |
|---|---|---|---|---|
|   | 0 | 1 | 2 | 3 |
| 0 | $P_0$ | $P_1$ | $P_4$ | $P_5$ |
| 1 | $P_2$ | $P_3$ | $P_6$ | $P_7$ |
| 2 | $P_8$ | $P_9$ | $P_{12}$ | $P_{13}$ |
| 3 | $P_{10}$ | $P_{11}$ | $P_{14}$ | $P_{15}$ |

|   | U → | | | |
|---|---|---|---|---|
|   | 0 | 1 | 2 | 3 |
| 0 | 0 | 1 | 4 | 5 |
| 1 | 2 | 3 | 6 | 7 |
| 2 | 8 | 9 | 12 | 13 |
| 3 | 10 | 11 | 14 | 15 |

V ↓

STORAGE CIRCUIT CONTROL DEVICE AND GRAPHIC COMPUTATION DEVICE

BACKGROUND OF THE INVENTION

1. Field of the Invention

The present invention relates to a storage circuit control device and the method thereof, and a graphic computation device and the method thereof, capable of simultaneously processing image data for multiple pixels, and moreover efficiently using the storage area of the storage circuit.

2. Description of the Related Art

Computer graphics are often used in various CAD (Computer Aided Design) systems, amusement devices, and so forth. Particularly, recent advancements in image processing technology has given rise to rapid propagation of systems using three-dimensional computer graphics.

With such three-dimensional computer graphics, rendering processing is performed in order to display the graphics on a display such as a CRT (Cathode Ray Tube) having pixels arrayed in matrix fashion.

In this rendering processing, the color data for each pixel is calculated, and the obtained color data is written to a display buffer (frame buffer) corresponding with the pixel. One of the techniques for rendering processing is polygon rendering. With this technique, a three-dimensional model is expressed as a combination of triangular unit shapes (polygons), and drawing is performed in units of these polygons, thereby determining the color of the display screen.

With three-dimensional computer graphics systems using such polygon rendering, texture mapping processing is performed at the time of drawing. This texture mapping processing reads texture data indicating an image pattern from a texture buffer in units of triangles, and pasts this read texture data onto the surface of the three-dimensional model, so as to obtain highly realistic image data.

With the texture mapping processing, as shown below, a two-dimensional texture address for specifying a pixel projecting an image according to the image data is calculated, and this is used as a texture address to make reference to texture data stored in the texture buffer.

Specifically, first, the (s, t, q) of each pixel within the triangle is calculated from linear interpolation, based on the $(s_1, t_1, q_1)$, $(s_2, t_2, q_2)$, and $(s_3, t_3, q_3)$ indicating the homogeneous coordinates (s, t) of the apexes of the triangle and the homogeneous item q.

Now, in simple terms, the homogeneous item q is the ratio of enlargement or reduction.

Next, division yields the (s/q, t/q) for each pixel, the s/q and t/q are each multiplied by the texture size USIZE and VSIZE, thereby generating texture coordinates data (u, v).

Next, the texture coordinates data (u, v) is converted into a texture address (U, V) on the texture buffer, and this texture address (U, V) is used to read the texture data from the texture buffer.

With three-dimensional computer graphics systems such as described above, the texture data may be stored in a two-dimensional array corresponding to a U and V coordinates system in the storage area of the texture buffer, so that direct reference can be made to the texture buffer using the texture address (U, V). That is to say, the two-dimensional texture address (U, V) may be directly used to access texture data stored in the texture buffer. This method simplifies the processing for accessing the texture data.

However, there is a problem with this method, in that storing multiple types of texture data in the texture buffer results in available area which cannot be efficiently used as shown in FIG. 12, due to the relation between the size of the texture data to be stored and the size of the available area, and consequently the storage area cannot be efficiently used.

For example, as shown in FIG. 12, in the event of storing pieces of texture data 400, 401, 402, 403, and 406, each with differing address lengths in the U and V directions, within the address space of the texture buffer so that direct reference can be made with the texture address (U, V), available areas 410 and 411 where texture data cannot be stored is created due to the relation between the two-dimensional size of the texture data to be stored and the two-dimensional size of the available area.

Consequently, a texture buffer having an extremely great storage capacity in comparison to the amount of texture data to be stored must be used, increasing the scale of the system and raising costs.

Accordingly, conventional systems calculate a one-dimensional physical address A from a two-dimensional address (U, V), based on "physical address A=V×(texture width)+U", and use this physical address A to access the texture buffer, in order to use the storage area of the texture buffer in an efficient manner. Thus, texture data can be stored without creating an available area in the storage area of the texture buffer, as shown in FIG. 13.

Incidentally, "texture width" refers to the address length in the U direction, in the address space of the texture buffer.

FIG. 14 is a partial configuration diagram of a conventional three-dimensional computer graphic system.

As shown in FIG. 14, the physical address A for each pixel is calculated from the $(s_1, t_1, q_1)$, $(s_2, t_2, q_2)$, and $(s_3, t_3, q_3)$ of the apex of the triangle as described above, in the address converting device 104 built into the texture mapping device 101. Then, using this calculated physical address A, the texture data (R, G, B, α) is read from the texture buffer 102 to the texture mapping device 101, this texture data (R, G, B, α) is pasted to the pixels corresponding to the surface of the three-dimensional model, thereby generating plotting data S101. This plotting data S101 is written to the display buffer 103.

Also, with high-speed three-dimensional computer graphics systems, as shown in FIG. 15 for example, an n number of texture mapping devices $101_1$ through $101_n$ each having built-in address converting devices $104_1$ through $104_n$, and texture mapping processing is simultaneously performed for an n number of pixels in a parallel manner, thereby simultaneously writing the plotting data $S101_1$ through $S101_n$ to the display buffer.

Now, three-dimensional computer graphics systems such as described above may perform processing by simultaneously reading image data of pixels arrayed within a certain rectangle in a 2-by-2 or 4-by-4 matrix form.

However, using the physical address A generated by "physical address A=V×(texture width)+U" may make it difficult to guarantee that simultaneously read image data will be stored in different banks in the texture buffer.

Accordingly, with conventional three-dimensional computer graphics systems, access to the texture buffer regarding image data for simultaneous processing of multiple pixels has been made using two-dimensional texture addresses (U. V). Accordingly, as described above, there is the problem that the storage area of the texture buffer cannot be used efficiently.

SUMMARY OF THE INVENTION

The present invention has been made in light of the problems with the conventional art, and accordingly, it is an object of the present invention to provide a storage circuit control device and a graphic computation device capable of efficiently using the storage area of the texture buffer with a small circuit configuration, and moreover enabling simultaneous processing of image data for multiple pixels.

It is another object of the present invention to provide a storage circuit control method and a graphic computation method capable of efficiently using the storage area of the texture buffer, and moreover enabling simultaneous processing of image data for multiple pixels.

In order to solve the above-described problems with the conventional art, and to achieve the above objects, the storage circuit control device according to the present invention is a storage circuit control device which stores in a storage circuit two-dimensional image data including pixel data indicating the color of a plurality of pixels arrayed in matrix fashion, and simultaneously accesses the pixel data regarding the plurality of pixels stored in the storage circuit using a two-dimensional address (U, V) corresponding to the two-dimensional positioning of the plurality of pixels;

wherein storage to the storage circuit is performed such that unit blocks, including the plurality of pixel data to be simultaneously accessed, are stipulated, and stored in the storage circuit so that a plurality of unit blocks making up the two-dimensional image data are continuously positioned within a one-dimensional address space within the storage circuit.

The storage circuit preferably may have at least a number of banks corresponding to the pixel data to be simultaneously accessed, wherein each piece of the simultaneously-accessed plurality of pixel data included in the unit blocks is stored in mutually differing banks in the storage circuit.

Also, the simultaneously-accessed plurality of pixel data may consist of pixel data for a plurality of pixels arrayed in matrix fashion.

Further, the storage circuit control device may comprise: an address generating means for combining the bit data making up the U address of the two-dimensional address (U, V) represented by n bits (wherein n is an integer of 1 or greater) and the bit data making up the V address of the two-dimensional address (U, V) represented by m bits (wherein m is an integer of 1 or greater), so as to generate an (n+m) bit one-dimensional address; and data accessing means for accessing the storage circuit using the generated one-dimensional address.

Also, in the event that the integer n and the integer m are equal;

k is an integer expressed by (n−1)<k<0;

the U address is represented by the n bits of (U [n−1], . . . , U[k], . . . , U[0]);

and the V address is represented by the n bits of (V[n−1], V[k], . . . , V[0]);

the address generating means may combine each of the bit data U[n−1], . . . , U[k], . . . , U[0] of the U address with each of the bit data V[n−1], . . . , V[k], . . . , V[0] of the V address, thereby generating 2n bits of one-dimensional addresses (V[n−1], U[n−1], . . . , V[k], U[k], . . . , V[0], U[0]).

According to a graphic computation device according to a first aspect of the present invention, a three-dimensional model is represented by a combination of a plurality of unit shapes, and addresses corresponding to the homogeneous coordinates (s, t) and the homogeneous item q included in the pixel data representing the color of each pixel positioned within the unit shapes are used to simultaneously read a plurality of pixel data stored in the storage circuit making up texture data which is image data to be pasted to the unit shapes and perform the pasting thereof to the unit shapes, the graphic computation device comprising:

a storage circuit to which storage is performed such that unit blocks, comprising the plurality of pixel data to be simultaneously accessed, are stipulated, and stored so that a plurality of unit blocks making up the texture data are continuously positioned within a one-dimensional address space within the storage circuit;

a two-dimensional address generating means for generating two-dimensional addresses (U, V) based on the results of dividing the homogeneous coordinates (s, t) by the homogeneous item q, i.e., (s/q, s/t);

a one-dimensional address generating means for generating one-dimensional addresses from the two-dimensional addresses (U, V); and a data reading means for using the generated one-dimensional addresses to read the texture data from the storage circuit in units of the unit blocks, and perform pasting thereof to the unit shapes.

With the graphic computation device according to the first aspect of the present invention, two-dimensional addresses (U, V) are generated at the two-dimensional address generating means, based on the results of dividing the homogeneous coordinates (s, t) by the homogeneous item q, i.e., (s/q, s/t).

Next, one-dimensional addresses are generated from the above-generated two-dimensional addresses, at the one-dimensional address generating means.

Next, at the data reading means, the above generated one-dimensional addresses are used to read the texture data from the storage circuit in units of the unit blocks, and paste the unit blocks to the unit shapes.

According to the graphic computation device according a second aspect of to the present invention, a three-dimensional model is represented by a combination of a plurality of unit shapes, and addresses corresponding to the homogeneous coordinates (s, t) and the homogeneous item q included in the pixel data representing the color of each pixel positioned within the unit shapes are used to simultaneously read a plurality of pixel data stored in the storage circuit making up texture data which is image data to be pasted to the unit shapes and perform the pasting thereof to the unit shapes, the graphic computation device comprising:

a storage circuit to which storage is performed such that unit blocks, comprising the plurality of pixel data to be simultaneously accessed, are stipulated, and stored so that a plurality of unit blocks making up the texture data are continuously positioned within a one-dimensional address space within the storage circuit;

a polygon rendering data generating means for generating polygon rendering data regarding the apex of the unit shape, including data for three-dimensional coordinates (x, y, z), R (red), G (green), B (blue), and homogeneous coordinates (s, t) and homogeneous item q;

an interpolation data generating means for interpolating the polygon rendering data for the apex of the unit shape, and generating interpolation data for pixels positioned within the unit shape;

a two-dimensional address generating means for generating two-dimensional addresses (U, V) based on the results of dividing the homogeneous coordinates (s, t)

included in the interpolation data by the homogeneous item q, i.e., (s/q, s/t);

a one-dimensional address generating means for generating one-dimensional addresses from the two-dimensional addresses (U, V); and a data reading means for using the generated one-dimensional addresses to read the texture data from the storage circuit in units of the unit blocks, and perform pasting thereof to the unit shapes.

With the graphic computation device according to the second aspect of the present invention, first, polygon rendering data regarding the apex of the unit shape, including data for three-dimensional coordinates (x, y, z), R (red), G (green), B (blue), and homogeneous coordinates (s, t) and homogeneous item q, is generated at the polygon rendering data generating means.

Next, at the interpolation data generating means, the polygon rendering data for the apex of the unit shape is interpolated, and interpolation data for pixels positioned within the unit shape is generated.

Next, the two-dimensional addresses (U, V) are generated at the two-dimensional address generating means, based on the results of dividing the homogeneous coordinates (s, t) included in the interpolation data by the homogeneous item q, i.e., (s/q, s/t).

Then, the one-dimensional addresses are generated at the one-dimensional address generating means from the above-generated two-dimensional addresses (U, V).

Further, at the data reading means, the generated one-dimensional addresses are used to read the texture data from the storage circuit in units of the unit blocks, and paste the unit blocks to the unit shapes.

According to the graphic computation device according to a third aspect of the present invention, a three-dimensional model is represented by a combination of a plurality of unit shapes, wherein addresses corresponding to the homogeneous coordinates (s, t) and the homogeneous item q included in the pixel data representing the color of each pixel positioned within the unit shapes are used to simultaneously read a plurality of pixel data stored in the storage circuit making up texture data which is image data to be pasted to the unit shapes and perform the pasting thereof to the unit shapes, the graphic computation device comprising:

a polygon rendering data generating device for generating polygon rendering data regarding the apex of the unit shape, including data for three-dimensional coordinates (x, y, z), R (red), G (green), B (blue), and homogeneous coordinates (s, t) and homogeneous item q;

a rendering device for performing rendering processing using the polygon rendering data; and a bus for connecting the polygon rendering data generating device and the rendering device;

wherein the rendering device comprises:

a storage circuit to which storage is performed such that unit blocks, comprising the plurality of pixel data to be simultaneously accessed, are stipulated, and stored so that a plurality of unit blocks making up the texture data are continuously positioned within a one-dimensional address space within the storage circuit;

an interpolation data generating means for interpolating the polygon rendering data input from the polygon rendering data generating device via the bus, and generating interpolation data for pixels positioned within the unit shape;

a two-dimensional address generating means for generating two-dimensional addresses (U, V) based on the results of dividing the homogeneous coordinates (s, t) included in the interpolation data by the homogeneous item q, i.e., (s/q, s/t);

a one-dimensional address generating means for generating one-dimensional addresses from the two-dimensional addresses (U, V); and a data reading means for using the generated one-dimensional addresses to read the texture data from the storage circuit in units of the unit blocks, and perform pasting thereof to the unit shapes.

With the graphic computation device according to the third aspect of the present invention, polygon rendering data regarding the apex of the unit shape, including data for three-dimensional coordinates (x, y, z), R (red), G (green), B (blue), and homogeneous coordinates (s, t) and homogeneous item q, is generated at the polygon rendering data generating device. This polygon rendering data is transferred to the rendering device via the bus.

Next, the following processing is performed in the rendering device.

That is, the polygon rendering data input from the polygon rendering data generating device via the bus is interpolated at the interpolation data generating means, and interpolation data for pixels positioned within the unit shape is generated.

Next, two-dimensional addresses (U, V) are generated at the two-dimensional address generating means, based on the results of dividing the homogeneous coordinates (s, t) included in the interpolation data by the homogeneous item q, i.e., (s/q, s/t).

Next, one-dimensional addresses are generated at the one-dimensional address generating means from the above-generate two-dimensional addresses (U, V).

Then, the data reading means uses the generated one-dimensional addresses to read the texture data from the storage circuit in units of the unit blocks, and paste the unit blocks to the unit shapes.

Also, the storage circuit control method according to the present invention is a storage circuit control method for storing in a storage circuit two-dimensional image data including pixel data indicating the color of a plurality of pixels arrayed in matrix fashion, and simultaneously accessing the pixel data regarding the plurality of pixels stored in the storage circuit using a two-dimensional address (U, V) corresponding to the two-dimensional positioning of the plurality of pixels;

wherein storage to the storage circuit is performed such that unit blocks, including the plurality of pixel data to be simultaneously accessed, are stipulated, and stored in the storage circuit so that a plurality of unit blocks making up the two-dimensional image data are continuously positioned within a one-dimensional address space within the storage circuit.

Further, according to the graphic computation method according to the present invention, a three-dimensional model is represented by a combination of a plurality of unit shapes, and addresses corresponding to the homogeneous coordinates (s, t) and the homogeneous item q included in the pixel data representing the color of each pixel positioned within the unit shapes are used to simultaneously read a plurality of pixel data stored in the storage circuit making up texture data which is image data to be pasted to the unit shapes and perform the pasting thereof to the unit shapes, the graphic computation method comprising the steps of:

storing in a storage circuit such that unit blocks, comprising the plurality of pixel data to be simultaneously accessed, are stipulated, and stored so that a plurality of unit blocks making up the texture data are continuously positioned within a one-dimensional address space within the storage circuit;

generating two-dimensional addresses (U, V) based on the results of dividing the homogeneous coordinates (s, t) by the homogeneous item q, i.e., (s/q, s/t);

generating one-dimensional addresses from the two-dimensional addresses (U, V); and using the generated one-dimensional addresses to read the texture data from the storage circuit in units of the unit blocks and perform pasting thereof to the unit shapes.

BRIEF DESCRIPTION OF THE DRAWINGS

FIG. 10 is a diagram of a three-dimensional computer graphics system according to a second embodiment of the present invention, describing simultaneously-accessed pixel data included in texture data;

FIG. 11 is a diagram of the three-dimensional computer graphics system according to the second embodiment of the present invention, describing a method for generating a one-dimensional physical address A from a two-dimensional texture address (U, V);

DETAILED DESCRIPTION OF THE PREFERRED EMBODIMENTS

The following is a description of an embodiment of a three-dimensional computer graphics system which performs high-speed display onto a display device such as a CRT, of desired three-dimensional images corresponding to an arbitrary three-dimensional object model, such as is applied to home video games and the like.

First Embodiment

Figure 1:
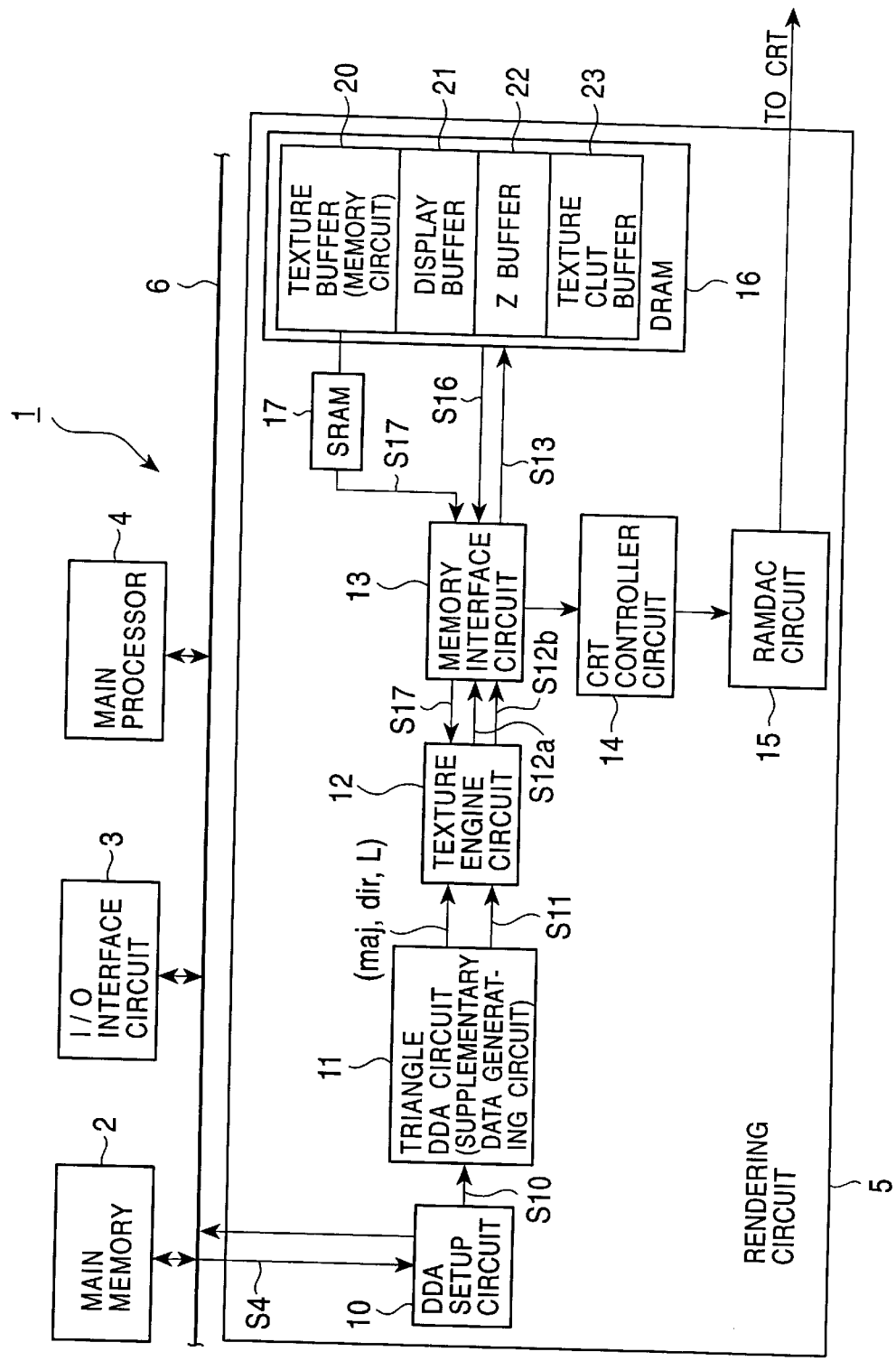
FIG. 1 is a system configuration diagram of a three-dimensional computer graphics system according to an embodiment of the present invention.

FIG. 1 is a system configuration diagram of a three-dimensional computer graphics system 1 according to the present embodiment.

The three-dimensional computer graphics system 1 is a system performs polygon rendering processing, which represents three-dimensional models as a combination of unit shapes which are triangles (polygons), and plots these polygons to determine the color for each pixel in the display screen which is then displayed on the display.

Also, with the three-dimensional computer graphics system 1, in addition to the (x, y) coordinates representing the position on the plane, a z-coordinate is used to represent depth, thereby representing a three-dimensional model, and an arbitrary point in the three-dimensional space is specified by these three coordinates, (x, y, z).

As shown in FIG. 1, with the three-dimensional computer graphics system 1, a main memory 2, I/O interface circuit 3, main processor 4, and rendering circuit 5 are connected via a main bus 6.

The following is a description of the functions of each component.

The main processor 4 reads necessary graphic data from the main memory 2 according to the state of progression of the game or the like, performs clipping, lighting, geometry, or likewise processing regarding this graphic data, thereby generating polygon rendering data. The main processor 4 outputs the polygon rendering data S4 to the rendering circuit 5 via the main bus 6.

The I/O interface circuit 3 externally inputs polygon rendering data as necessary, and outputs this to the rendering circuit 5 via the main bus 6.

Now, the polygon rendering data contains the (x, y, z, R, G, B, α, s, t, q, F) data for the each of the three apexes of the polygon.

Here, the (x, y, z) data indicates the three-dimensional coordinates of the polygon apexes, and the (R, G, B) data indicates the brightness values of red, green, and blue at each of the three-dimensional coordinates.

The data a represents a blending coefficient for blending of the R, G, and B data of the pixels to be plotted with the pixels already stored in the display buffer 21.

Of the (s, t, q) data, the (s, t) indicates the homogeneous coordinates of the corresponding texture, and q indicates a homogeneous item. Now, "s/q" and "t/q" are multiplied by respective texture sizes USIZE and VSIZE so as to obtain texture coordinates data (u, v). Access to the texture data stored in the texture buffer 20 is performed using the texture coordinates data (u, v).

The F data indicates the α value of fogging.

In other words, the polygon rendering data indicates the physical coordinates value of the apexes of the triangle, the color and texture of each apes, and fog value data.

Next, the rendering circuit 5 will be described in detail.

As shown in FIG. 1, the rendering circuit 5 has a DDA (Digital Differential Analyzer) setup circuit 10 triangle DDA circuit 11, texture engine circuit 12, memory interface circuit 13, CRT controller circuit 14, RAMDAC circuit 15, DRAM 16, and SRAM 17.

DRAM 16 and SRAM 17

Figure 2:
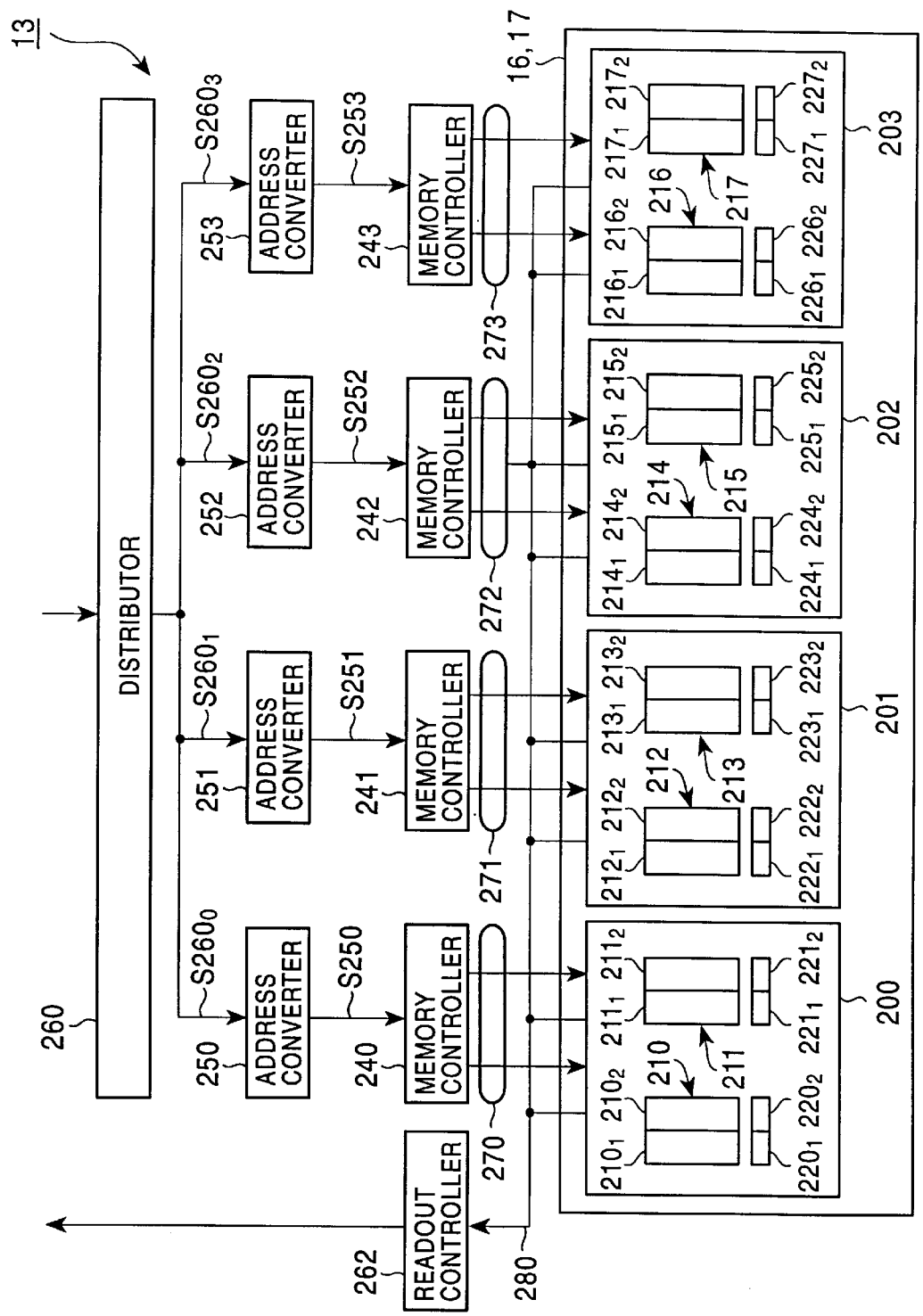
FIG. 2 is a configuration diagram of the DRAM and SRAM shown in FIG. 1 and blocks having access functions to the DRAM and SRAM of the memory interface circuit.

FIG. 2 is a configuration diagram of DRAM 16, SRAM 17, and blocks having access functions to the DRAM 16 and SRAM 17 of the memory interface circuit 13.

As shown in FIG. 2, the DRAM 16 and SRAM 17 shown in FIG. 1 have memory modules 200, 201, 202, and 203.

The memory module 200 has memory 210 and 211.

The memory 210 has banks $210_1$ and $210_2$, comprising a part of the DRAM 16, and banks $220_1$ and $220_2$, comprising a part of the SRAM 17.

Also, the memory 211 has banks $211_1$ and $211_2$, comprising a part of the DRAM 16, and banks $221_1$ and $221_2$, comprising a part of the SRAM 17.

The banks $220_1$, $220_2$, $221_1$, and $221_2$ can be accessed simultaneously.

Now, each of the memory modules 201, 202, and 203 basically have the same configuration as the memory module 200.

Now, each of the memory modules 200, 201, 202, and 203 have all of the functions of the texture buffer 20, display buffer 21, Z buffer 22, and texture CLUT buffer 23 shown in FIG. 1.

That is to say, each of the memory modules 200, 201, 202, and 203 store all of the texture data of corresponding pixels, plotting data ((R, G, B) data), z data, and texture color look-up table data.

However, it should be noted that the memory modules 200, 201, 202, and 203 store data regarding mutually different pixels.

Now, the texture data regarding 16 pixels to be simultaneously processed, the plotting data, z data, and texture color look-up table data, are stored in mutually different banks $210_1$, $210_2$, $211_1$, $211_2$, $212_1$, $212_2$, $213_1$, $213_2$, $214_1$, $214_2$, $215_1$, $215_2$, $216_1$, $216_2$, $217_1$, and $217_2$.

Thus, the data regarding the 16 pixels can be simultaneously accessed as to the DRAM 16.

Incidentally, the banks $220_1$, $220_2$, $221_1$, $221_2$, $222_1$, $222_2$, $223_1$, $223_2$, $224_1$, $224_2$, $225_1$, $225_2$, $226_1$, $226_2$, $227_1$, and $227_2$ each store copies of the texture data stored in the banks $210_1$, $210_2$, $211_1$, $211_2$, $212_1$, $212_2$, $213_1$, $213_2$, $214_1$, $214_2$, $215_1$, $215_2$, $216_1$, $216_2$, $217_1$, and $217_2$.

Next, description will be made regarding the storage pattern of the texture data in the texture buffer 20.

Figure 3:
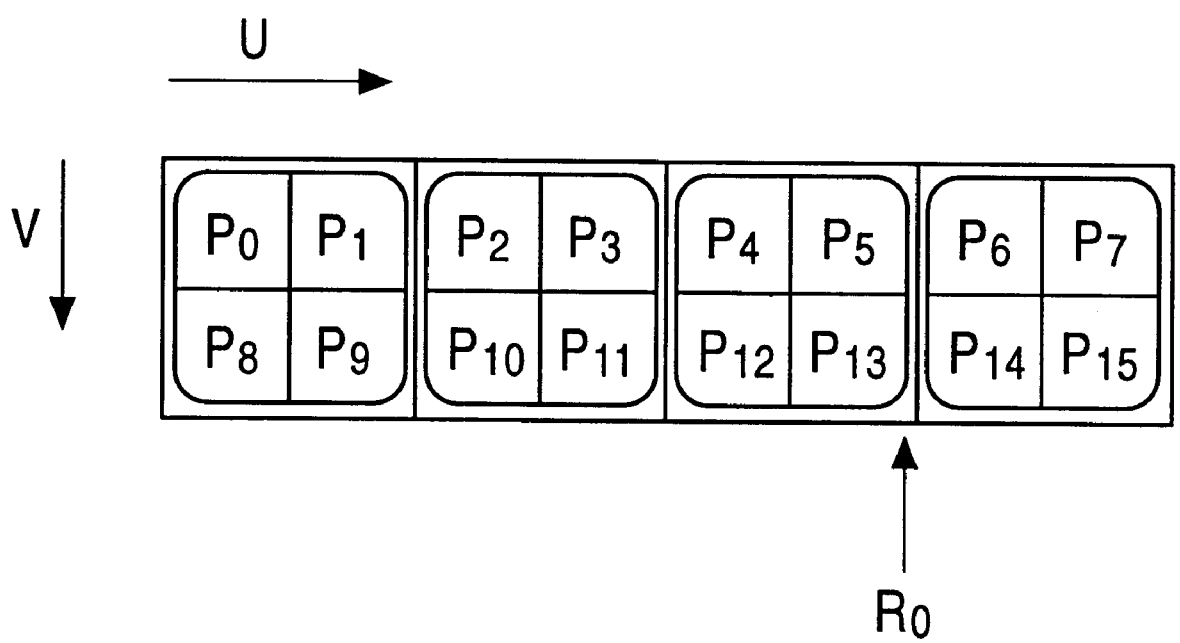
FIG. 3 is a diagram for describing simultaneously-accessed pixel data included in texture data.

Here, a case will be described wherein, as shown in FIG. 3, pixel data $P_0$ through $P_{15}$ indicating color data of pixels arrayed in a 2-by-8 matrix, included in the texture data, are simultaneously accessed.

The pixel data $P_0$ through $P_{15}$ must be stored in differing banks of the SRAM 17 making up the texture buffer 20.

According to the present embodiment, the pixel data $P_0$, $P_1$, $P_8$, and $P_8$ is stored in the banks $220_1$ and $220_2$ of the memory 210 and the banks $221_1$ and $221_2$ of the memory 211, each shown in FIG. 2. Also, the pixel data $P_2$, $P_3$, $P_{10}$, and $P_{11}$ is stored in the banks $222_1$ and $222_2$ of the memory 212 and the banks $223_1$ and $223_2$ of the memory 213, each shown in FIG. 2. Further, the pixel data $P_4$ $P_5$, $P_{12}$, and $P_{13}$ is stored in the banks $224_1$ and $224_2$ of the memory 214 and the banks $225_1$ and $225_2$ of the memory 215, each shown in FIG. 2. Moreover, the pixel data $P_6$, $P_7$, $P_{14}$, and $P_{15}$ is stored in the banks $226_1$ and $226_2$ of the memory 216 and the banks $227_1$ and $227_2$ of the memory 217, each shown in FIG. 2.

Figure 4:
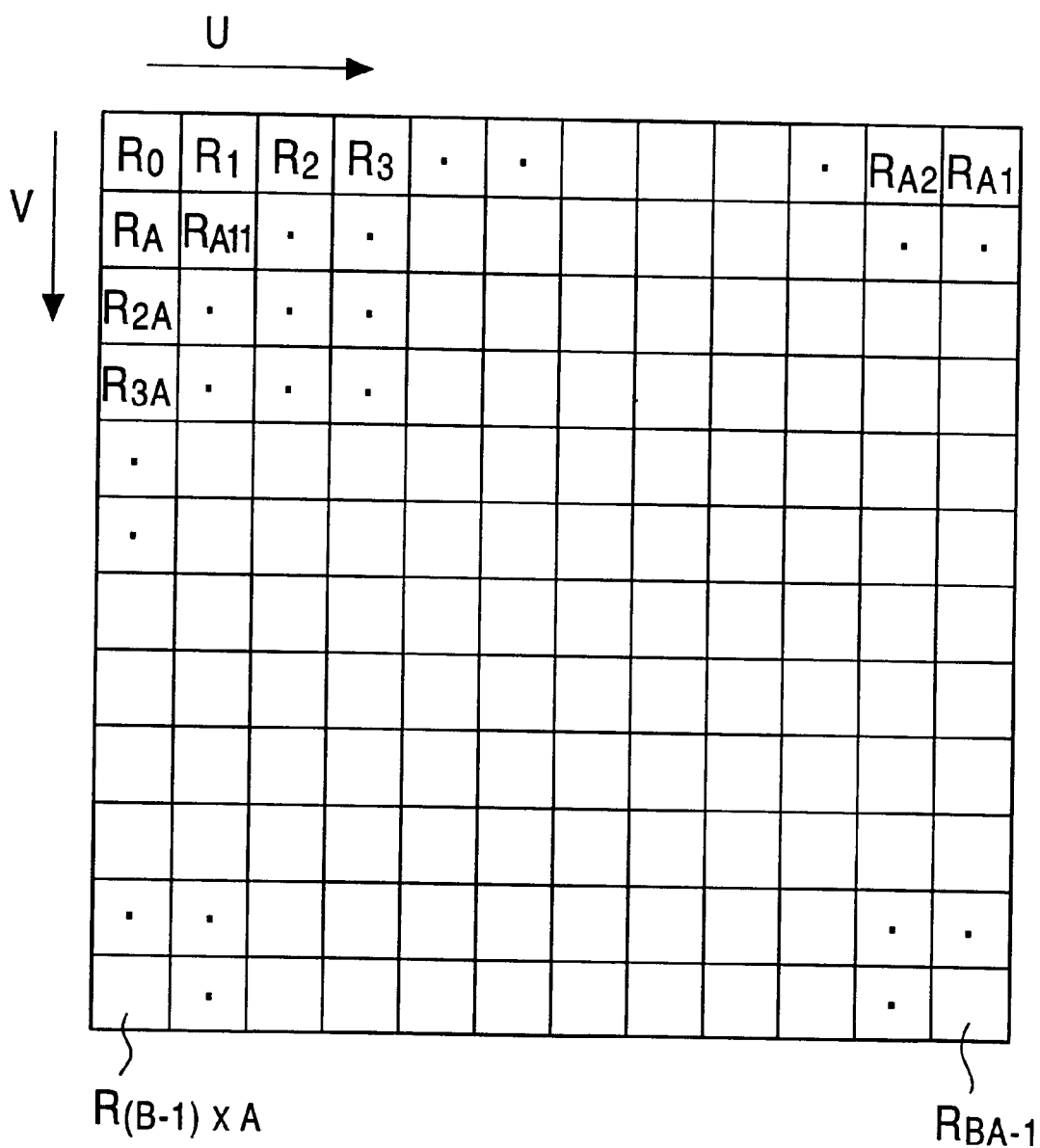
FIG. 4 is a diagram for describing unit blocks comprising texture data.

With the present embodiment, the set of pixel data $P_0$ through $P_{15}$ of pixels positioned within the simultaneously-processed rectangular area is referred to as unit block $R_j$, and, for example, texture data representing one image is comprised of unit blocks $R_0$ through $R_{BA-1}$, arrayed in a B-by-A matrix, as shown in FIG. 4.

Figure 5:
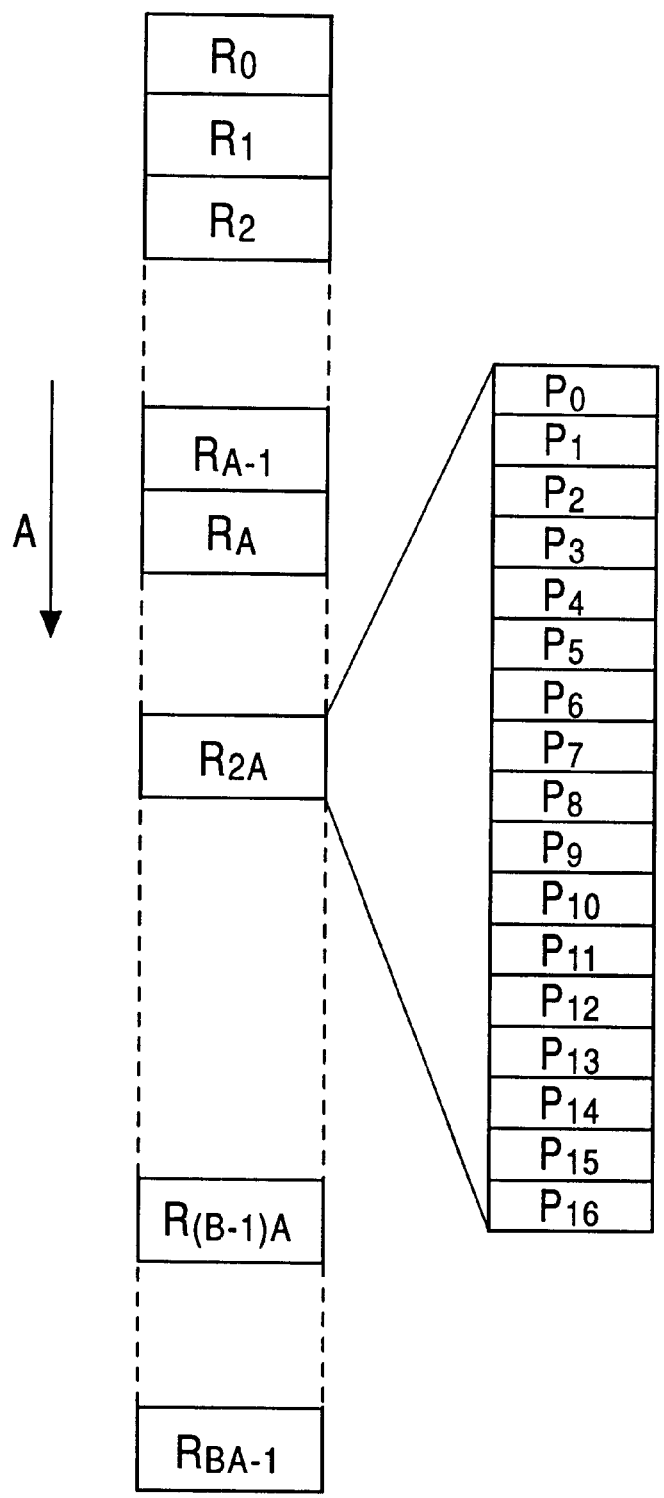
FIG. 5 is a diagram for describing address space of the texture buffer.

The unit blocks $R_0$ through $R_{BA-1}$ are stored in the SRAM 17 making up the texture buffer 20 so as to have continuous addresses in a one-dimensional address space, as shown in FIG. 5. Also, the pixel data $P_0$ through $P_{15}$ within the unit blocks $R_0$ through $R_{BA-1}$ are each stored in mutually differing banks in the SRAM 17, so as to have continuous addresses in a one-dimensional address space.

That is to say, unit blocks comprised of simultaneously-accessed pixel data are stored in the texture buffer 20 so as to have continuous addresses in a one-dimensional address space.

DDA Setup Circuit 10

The DDA setup circuit 10 performs setup computations for obtaining such as the differential of the sides and horizontal direction of the triangle, regarding data (z, R, G, B, α, s, t, q, F) indicated by the polygon rendering data 54, before the latter tier triangle DDA circuit 11 performs linear interpolation for each apex of the triangle on the physical coordinates and calculates the color and depth information for each pixel within the triangle.

Specifically, this setup computation calculates the variations of the value to be obtained in the event that there is movement of a unit length, using the starting point value and ending point value, and the distance between the starting point and ending point.

The DDA setup circuit 10 outputs the calculated variations data S10 to the triangle DDA circuit 11.

Triangle DDA Circuit 11

The triangle DDA circuit 11 uses the variations data S10 input from the DDA setup circuit 10 to calculate the linear-interpolated (z, R, G, B, α, s, t, q, F) data for each pixel within the triangle.

With the present embodiment, the triangle DDA circuit 11 outputs the (x, y) data for each pixel, and the (z, R, G. B, α, s, t, q, F) data for the (x, y) coordinates, to the texture engine circuit 12 as DDA data S11.

Texture Engine Circuit 12

The texture engine circuit 12 sequentially performs selection processing of the reduction ratio of the texture data, calculation processing of "s/q" and "t/q", calculation processing of texture coordinates data (u, v), calculation processing of two-dimensional texture addresses (U, V), generation of the one-dimensional address A, reading (R, G, B, tα) data from the texture buffer 20, and mixing processing (texture α blending processing), by the pipeline method.

At this time, the texture exchange circuit 12 simultaneously performs parallel processing for 8 pixels positioned within a certain rectangular area.

Figure 6:
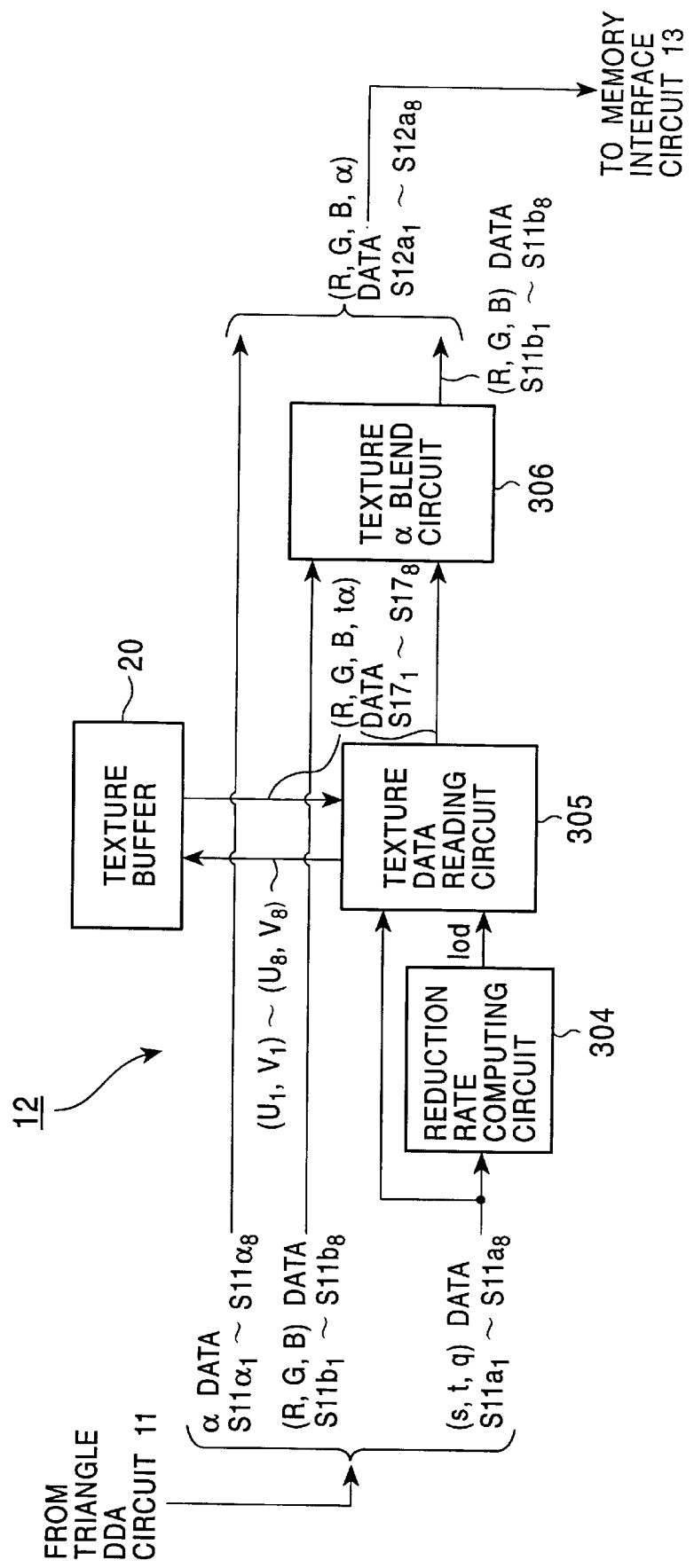
FIG. 6 is an internal configuration diagram of the texture engine circuit shown in FIG. 1.

FIG. 6 is a configuration diagram of the texture exchange circuit 12.

As shown in FIG. 6, the texture exchange circuit 12 has a reduction ratio computing circuit 304, texture data readout circuit 305, and a texture a blend circuit 306.

The reduction ratio computing circuit 304 calculates the reduction ratio 1od of the texture data, using the 8 pixels worth of (s, t, q) data $S11a_1$ through $S11a_8$ and the like included in the DDA data S11.

Now, the reduction ratio indicates to what extent the texture data of the original image has been reduced, and in the event that the reduction ratio of the original image is 1/1, the reduction ratio is 1/2, 1/4, 1/8, and so forth.

Figure 7:
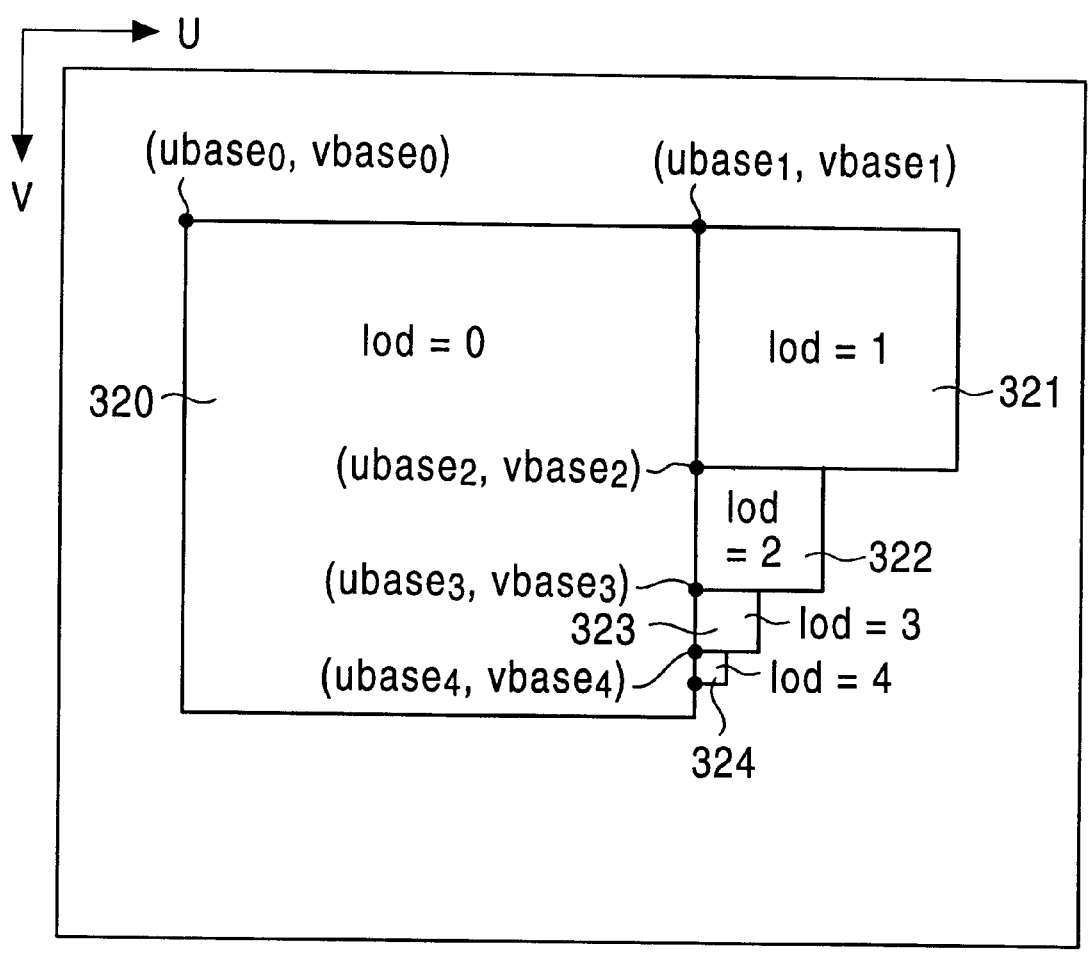
FIG. 7 is a diagram for describing texture data of multiple reduction ratios, stored in the texture buffer shown in FIG. 1 and subjected to MIPMAP filtering.

Stored in the texture buffer 20 are texture data 320, 321, 322, 323, 324, with lod=0, 1, 2, 3, 4, for example, as shown in FIG. 7.

Now, the address space within the storage area of the texture buffer 20 is represented by a U-V coordinates system as shown in FIG. 7, with a reference address (start address) in the storage area where texture data corresponding to multiple reduction ratios is stored, is calculated based on the reduction ratio lod. In the example shown in FIG. 2, the reference addresses for texture data 320, 321, 322, and 323 are ($ubase_0$, $vbase_0$), ($ubase_1$, $vbase_1$), ($ubase_2$, $vbase_2$), and ($ubase_3$, $vbase_3$).

Also, the texture address (U, V) for each of the pixels in the texture data stored in the texture buffer 20 is an address obtained by adding the reference address (ubase, vbase) and the texture coordinates data (u, v).

(Texture Data Readout Circuit 305)

The texture data readout circuit 305 inputs the 8 pixels worth of (s, t, q) data $S11a_1$ through $S11a_8$ included in the DDA data S11, the reduction rate lod from the reduction ratio computing circuit 304, and texture size USIZE and VSIZE, reads texture data $S17_1$ through $S17_8$ corresponding to each of the 8 pixels from the texture buffer 20, and outputs this to the texture a blend circuit 306.

Figure 8:
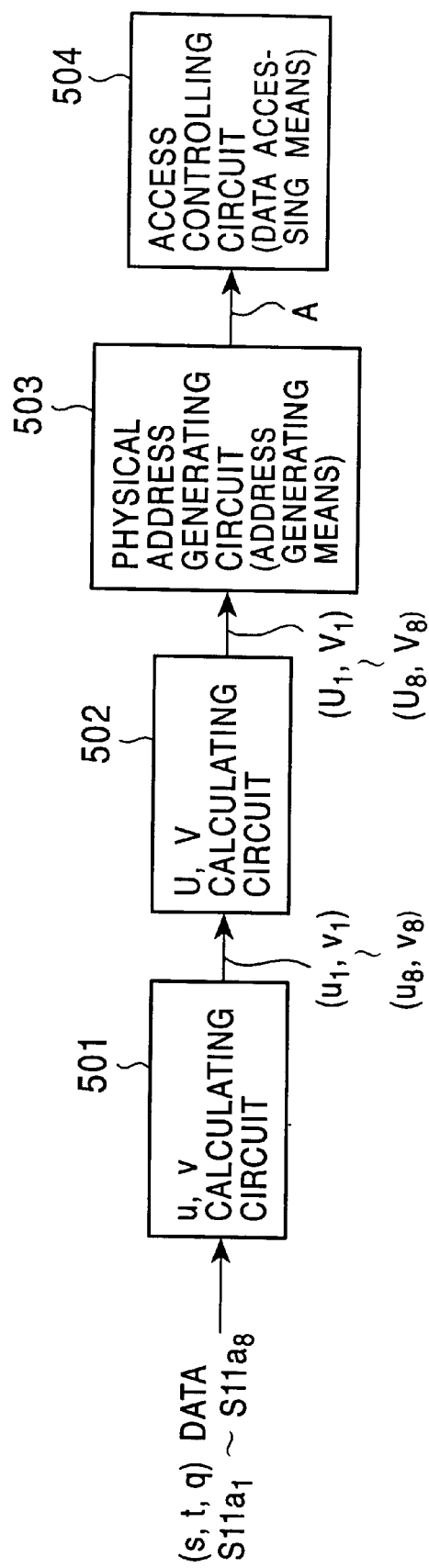
FIG. 8 is a configuration diagram of the texture data reading circuit.
Figure 9:
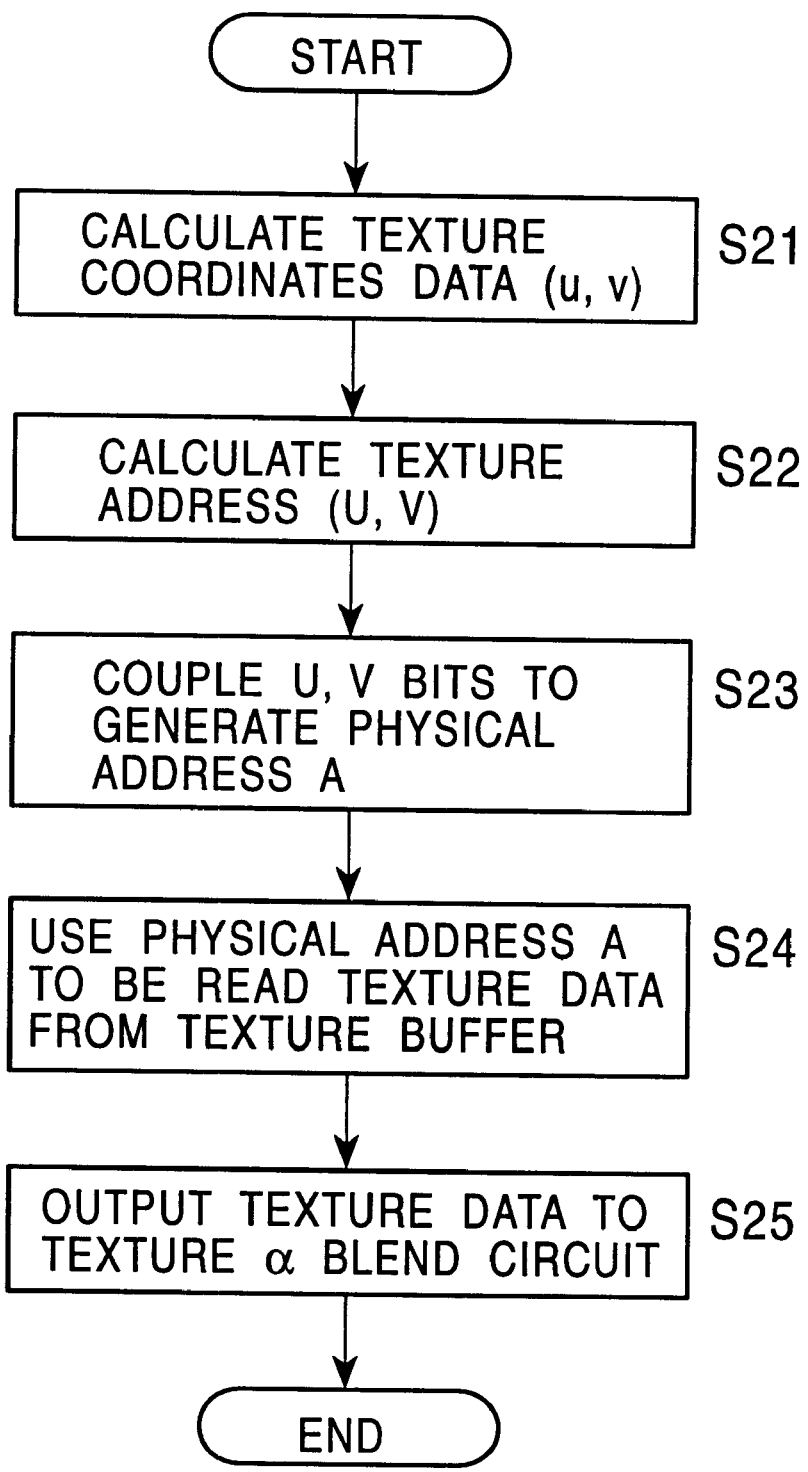
FIG. 9 is a flowchart of the processing in the texture data reading circuit shown in FIG. 6.
Figure 12:
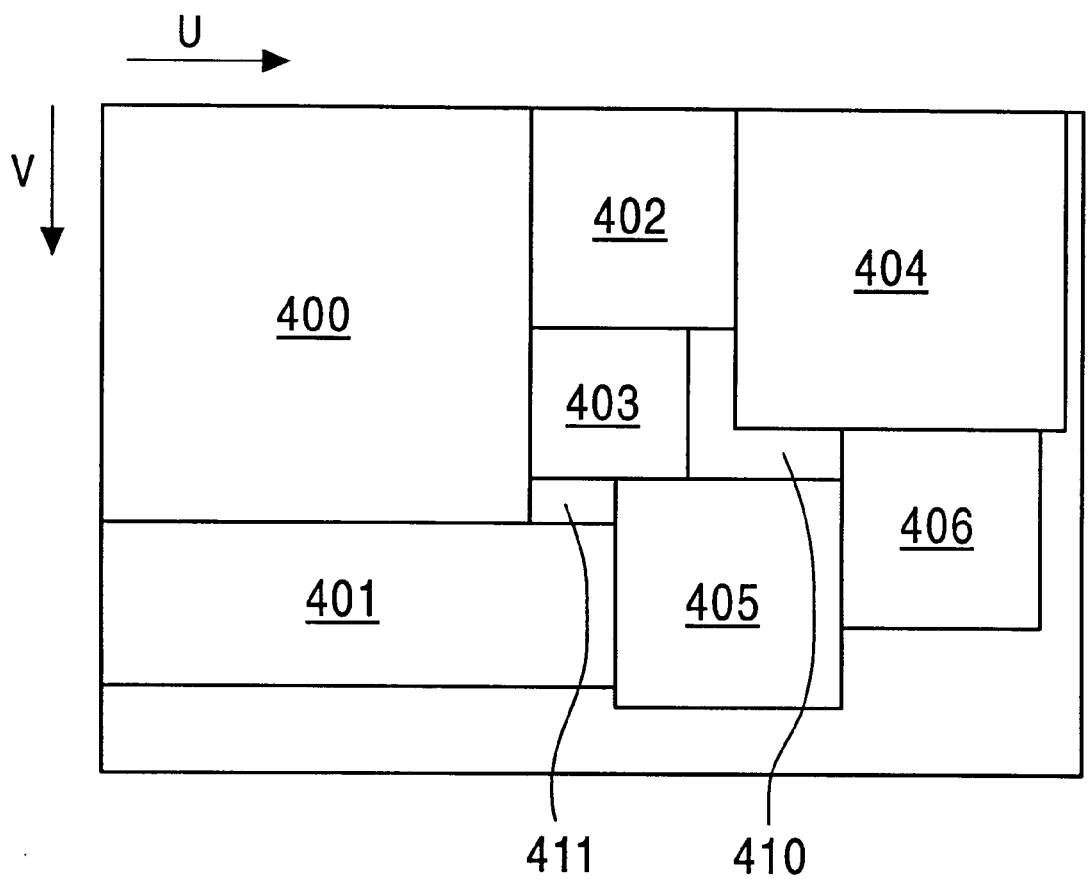
FIG. 12 is a diagram for describing the problems involved in directly using a two-dimensional texture address (U, V) to store multiple types of texture data in a texture buffer.
Figure 13:
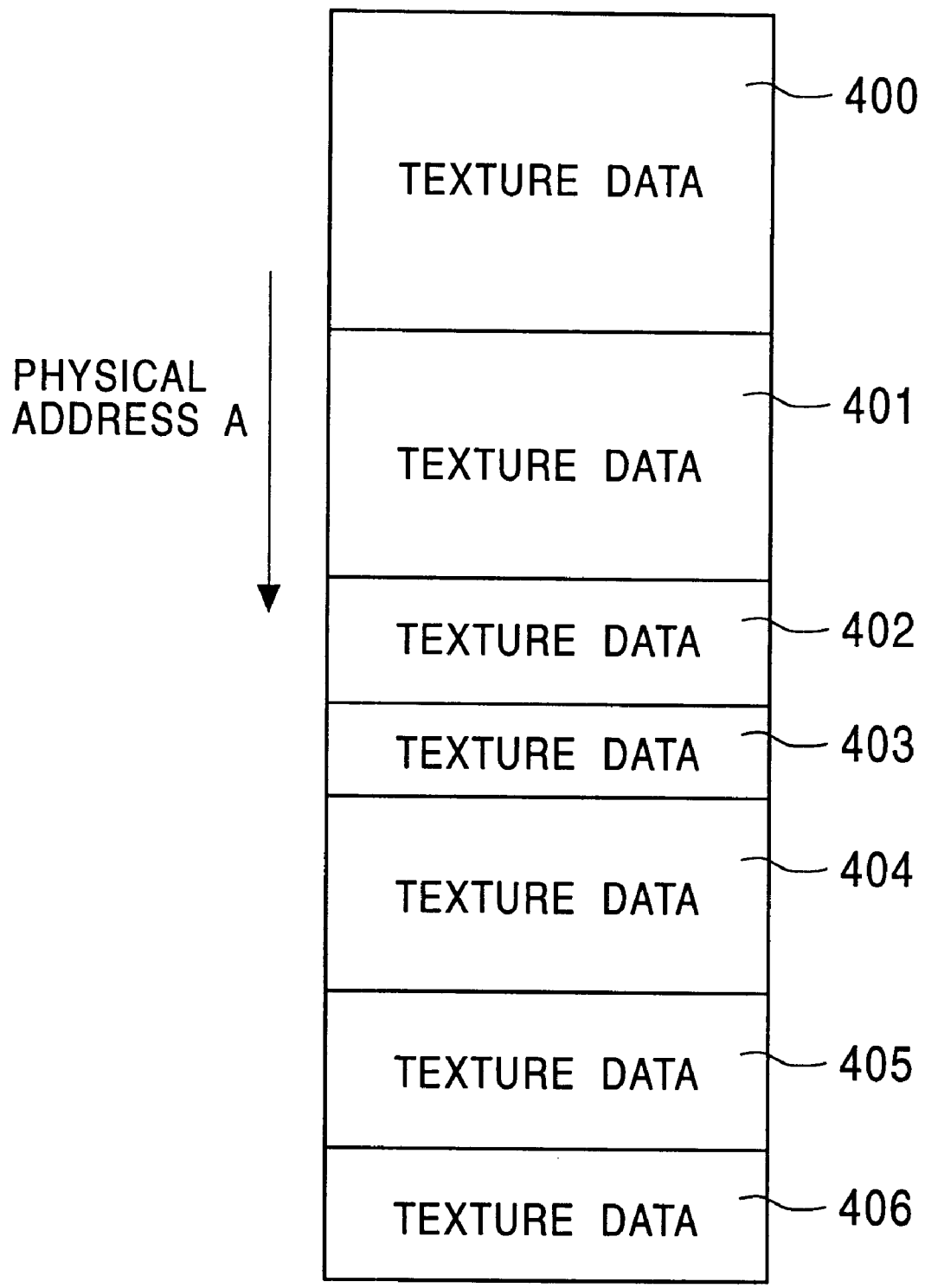
FIG. 13 is a diagram for describing the storage state when using a one-dimensional physical address to store multiple types of texture data in a texture buffer.
Figure 14:
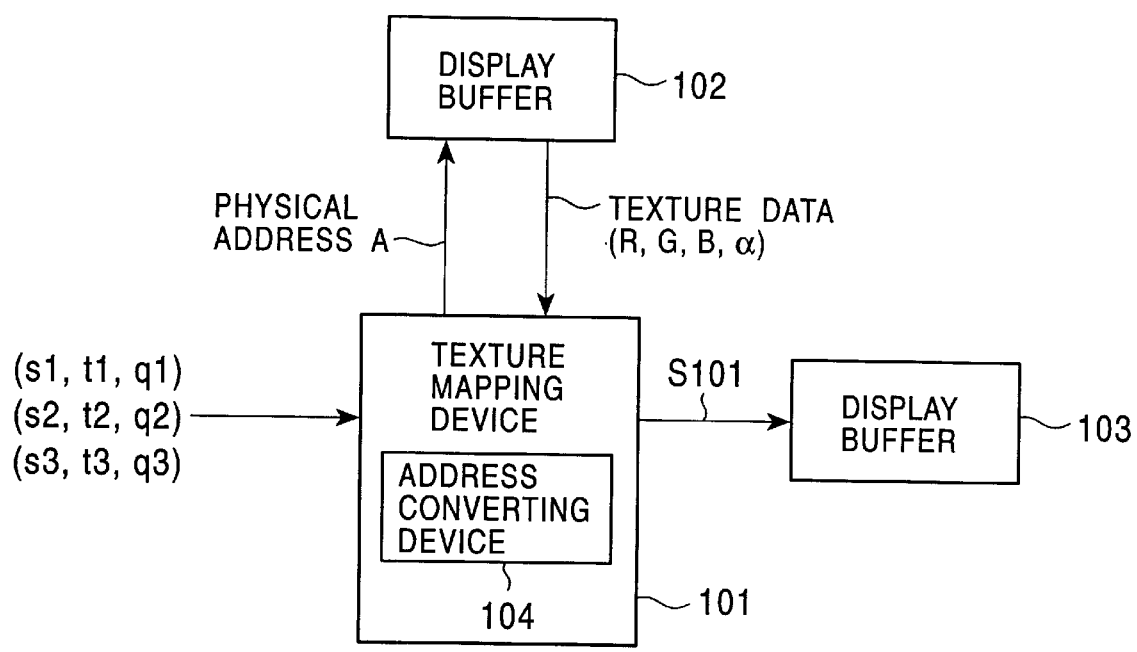
FIG. 14 is a partial configuration diagram of a conventional three-dimensional computer graphics system.
Figure 15:
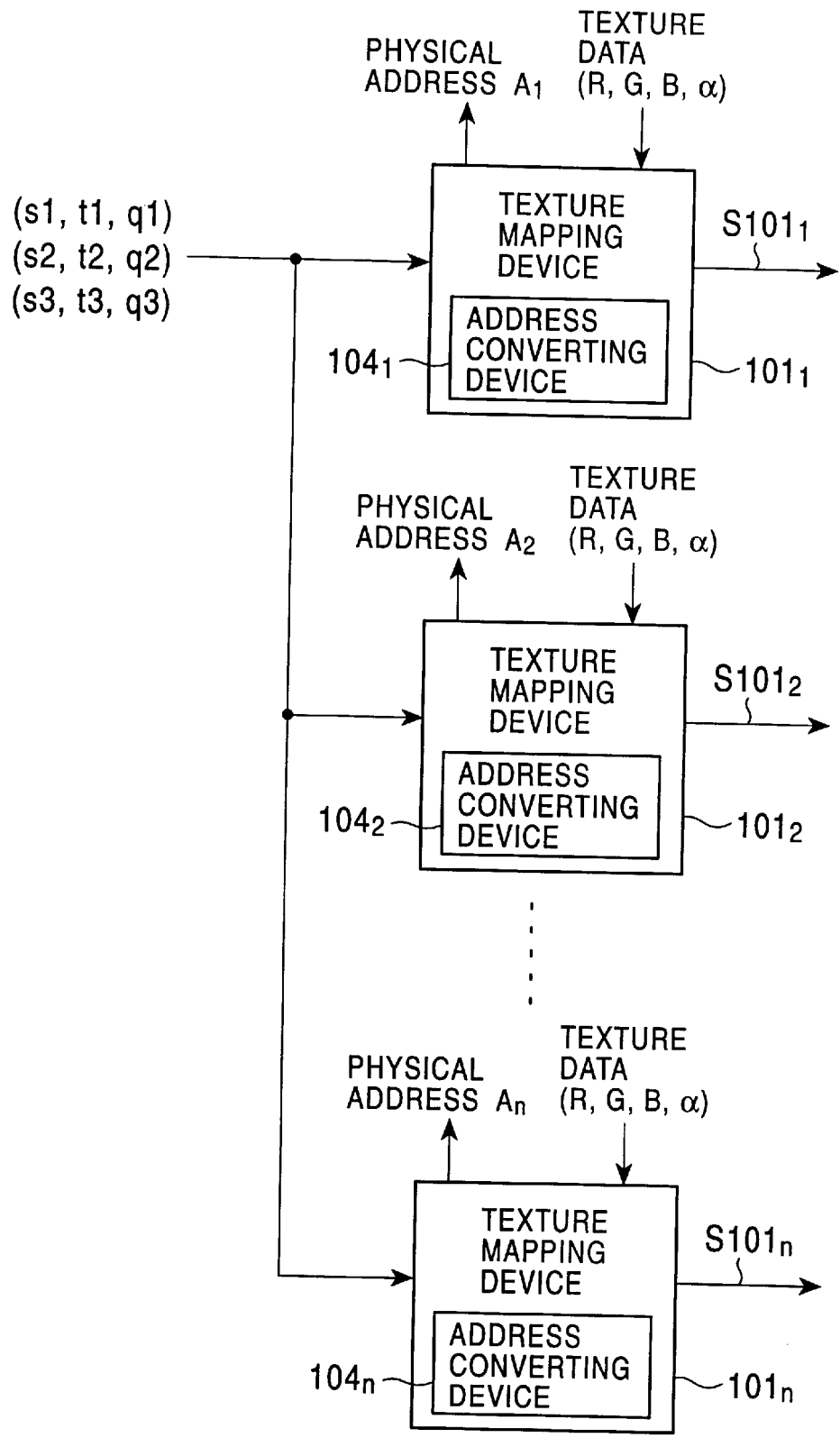
FIG. 15 is a partial configuration diagram of a conventional three-dimensional computer graphics system, capable of high-speed processing.

FIG. 8 is a configuration diagram of the texture data readout circuit 305. FIG. 9 is a flowchart of the processes performed in the texture data readout circuit 305.

As shown in FIG. 8, the texture data readout circuit 305 has a (u, v) calculating circuit 501, (U, V) calculating circuit 502, physical address generating circuit 503, and an access control circuit 504.

In step S21, the texture data readout circuit 305 first performs computation at the (u, v) calculating circuit 501 to divide the s data by the q data and to divide the t data by the q data for each of the 8 pixels worth of (s, t, q) data $S11a_1$ through $S11a_8$, so as to calculate the division results "s/q" and "t/q".

Then, the division results "s/q" and "t/q" are each multiplied by the texture size USIZE and VSIZE, thereby calculating texture coordinates data $(u_1, v_1)$ through $(u_8, v_8)$ corresponding to each pixel.

In step S22, the (U, V) calculating circuit 502 makes reference to an address table prepared beforehand, and obtains a reference address (ubase, vbase) corresponding to the reduction ratio lod.

Then, the (U, V) calculating circuit 502 adds the reference address (ubase, vbase) and the texture coordinates data $(u_1, v_1)$ through $(u_8, v_8)$ input from the (u, v) calculating circuit 501, thereby generating texture addresses $(U_1, V_1)$ through $(U_8, V_8)$ wherein the storage area of the texture buffer 20 is represented by a two-dimensional coordinates system.

In step S23, the physical address generating circuit 503 converts the texture addresses $(U_1, V_1)$ through $(U_8, V_8)$ input from the (U, V) calculating circuit 502 into one-dimensional physical addresses $A_1$ through $A_8$ in the address space shown in FIG. 5, based on the following Expression (1) for obtaining the physical address $A_i$.

Incidentally, the "A" shown to the right of the following Expression (1) is the dropped "A" in the unit block $R_{BA}$ shown in FIG. 4.

Expression (1)

$$\text{Physical address } A_i = (V_i \times A/2 + U_i/8) \tag{1}$$

At this time, the physical addressees $A_1$ through $A_8$ are continuous addressees in the address space shown in FIG. 5, and further, are addresses of different banks of the SRAM 17 making up the texture buffer 20 shown in FIG. 2.

For example, the physical addresses $A_1, A_2, A_3, A_4, A_5, A_6, A_7$, and $A_8$ indicate the addresses that the pixel data $P_0, P_1, P_2, P_3, P_4, P_5, P_6$, and $P_7$, of the unit block $R_{2A}$ shown in FIGS. 4 and 5 are each stored in the storage area of the banks $220_1, 220_2, 221_1, 221_2, 222_1, 222_2, 223_1$, and $223_2$ shown in FIG. 2.

In step S24, the access control circuit 504 outputs the one-dimensional physical addresses $A_1$ through $A_8$ obtained from the physical address generating circuit 503 to the texture buffer 20 via the memory interface circuit 13 shown in FIG. 1, and reads out the (R, G, B, tα) data $S17_1$ through $S17_8$ which is texture data, i.e., reads out the pixel data $P_0$ through $P_7$. At the same time, the pixel data $P_8$ through $P_{16}$ is also read out.

At this time, the pixel data $P_0$ through $P_{15}$ is stored in differing banks, so simultaneous reading is possible.

Incidentally, a copy of the texture data stored in the texture buffer 20 is stored in the SRAM 17, so the texture engine circuit 12 actually reads out the texture data stored in the SRAM 17, via the memory interface circuit 13.

In step S25, the access control circuit 504 outputs the (R, G, B, tα) data $S17_1$ through $S17_8$ read out in step S24 to the texture α blend circuit 306.

(Texture α Blend Circuit 306)

The texture α blend circuit 306 inputs the 8 pixels worth of (R, G, B) data $S11b_1$ through $S11b_8$ included in the DDA data S11, and the (R, G, B, tα) data $S17_1$ through $S17_8$ read by the texture data readout circuit 305, and mixes the (R, G, B) data contained in the (R, G, B) data $S11b_1$ through $S11b_8$ and the data $S17_1$ through $S17_8$ according to the mixture value indicated by the ta contained in the data $S17_1$ through $S17_8$, thereby generating (R, G, B) data $S306_1$ through $S306_8$.

Then, the α data $S11d_1$ through $S11d_8$ contained in the DDA data, and the (R, G, B) data $S306_1$ through $S306_8$ are output to the memory interface circuit 13 as (R, G, B, α) data $S12a_1$ through $S12a_8$.

Incidentally, in the case of the full-color method, the texture engine circuit 12 directly uses the (R, G, B, tα) data directly read out from the texture buffer 20. On the other hand, in the case of the index color method, the texture engine circuit 12 reads a color look-up table (CLUT) prepared beforehand from the texture CLUT buffer 23, transfers and stores this to build-in SRAM, and uses this color look-up table to obtain (R, G, B) data corresponding to the color index read from the texture buffer 20.

Memory Interface Circuit 13

Also, the memory interface circuit 13 compares the (R, G, B, α) data $S12a_1$ through $S12a_8$ input from the texture engine circuit 12, i.e., z data corresponding to the pixel data $S12a$, with the z data stored in the z buffer 22, and judges whether the image to be drawn by the input pixel data $S12a$ is closer to the viewpoint side than the image previously written to the display buffer 21 or not. In the event that the image to be drawn is closer, the z data stored in the z buffer 22 is updated with the z data corresponding to the pixel data $S12a$.

Also, when necessary, the memory interface circuit 13 performs blending of the (R, G, B) data contained in the pixel data $S12a$ with the (R, G, B) data already stored in the display buffer 21 according to a blending value indicated by α data corresponding to the pixel data $S12a$, i.e., performs α blending, and writes the post-blending (R, G, B) data to the display buffer 21.

The memory interface circuit 13 accesses the DRAM 16 simultaneously regarding 16 pixels.

As shown in FIG. 2, the memory interface circuit 13 has memory controllers 240, 241, 242, and 243, address converters 250, 251, 252, 253, a distributor 260, and a readout controller 262.

The distributor 260 inputs 16 pixels worth of (R, G, B) data at the time of writing for example, divides these into 4 pieces of image data $S260_0, S260_1, S260_2$, and $S260_3$, each consisting of 4 pixels worth of data, which are each output to the address converters 250, 251, 252, 253.

Here, the 1 pixel worth of (R, G, B) data and the z data are 32 bits each.

The address converters 250, 251, 252, 253 convert the (R, G, B) data input from the distributor 260 at the time of writing and the addresses corresponding to the z data, into addresses within the respective memory modules 200, 201, 202, and 203, and outputs the converted addresses S250, S251, S252, and S253 to the memory controller 240.

The memory controllers 240, 241, 242, and 243 are respectively connected to the memory modules 200, 201, 202, and 203 via wiring groups 270, 271, 272, and 273, and control access to the memory modules 200, 201, 202, and 203 at the time of writing.

Specifically, the memory controllers 240, 241, 242, and 243 simultaneously write the 4 pixels worth of (R, G, B) data and z data input from the distributor 260 to the memory modules 200, 201, 202, and 203 via the wiring groups 270, 271, 272, and 273.

At this time, at the memory module 200 for example, one pixel worth of (R, G, B) data and z data are stored to each of the banks $210_1$, $210_2$, $210_3$, and $210_4$. This is also true for the memory modules 201, 202, and 203.

Incidentally, with the present embodiment, each of the wiring groups 270, 271, 272, and 273 are 256 bits.

The readout controller 262 is connected to the memory modules 200, 201, 202, and 203 via the wiring group 280, and at the time of reading, reads out texture data, (R, G, B) data, z data, and texture color look-up table data from the memory modules 200, 201, 202, and 203 via the wiring group 280 in units of 8 pixels or 16 pixels.

Incidentally, with the present embodiment, the wiring group 280 is 1024 bits.

CRT Controller Circuit 14

The CRT controller circuit 14 generates addresses for display on an unshown CRT in a manner synchronous with supplied horizontal and vertical synchronizing signals, and outputs requests to read display data from the display buffer 21 to the memory interface circuit 13. In response to this request, the memory interface circuit 13 reads display data from the display buffer 21 in certain blocks. The CRT controller circuit 14 has a built-in FIFO (First In First Out) circuit for storing display data read from the display buffer 21, and outputs RGB index values to the RAMDAC circuit 15 at certain time intervals.

RAMDAC Circuit 15

The RAMDAC circuit 15 stores (R, G, B) data corresponding to each index value, and transfers digital format (R, G, B) data corresponding to the RGB index values input from the CRT controller circuit 14 to a D/A converter, thereby generating analog format (R, G, B) data. The RAMDAC circuit 15 outputs this generated R, G, B data to the CRT.

The following is a description of the operation of the three-dimensional computer graphics system 1.

With the three-dimensional computer graphics system 1 shown in FIG. 1, the polygon rendering data S4 is output from the main processor 4 to the DDA setup circuit 10 via the main bus 6, and conversion data S10 indicating the difference in the sides and horizontal direction of the triangle is generated in the DDA setup circuit 10.

Then, the conversion data S10 is output from the DDA setup circuit 10 to the triangle DDA circuit 11.

Next, in the triangle DDA circuit 11, linear-interpolated (z, R, G, B, 60, s, t, q, F) data for each pixel within the triangle is generated based on the variations data S10.

Then, the (x, y) data for each pixel, and the (z, R, G, B, α, s, t, q, F) data for the (x, y) coordinates, are output from the triangle DDA circuit 11 to the texture engine circuit 12 as DDA data S11.

Next, at the reduction ratio computing circuit 304 in the texture engine circuit 12 shown in FIG. 6, the reduction ratio of the texture data is calculated using the 8 pixels worth of (s, t, q) data $S11a_1$ through $S11a_8$ contained in the DDA data S11, and this reduction ratio lod is output to the texture data readout circuit 305.

Next, in the texture data readout circuit 305, according to the flow shown in FIG. 9, texture data $S17_1$ through $S17_8$ is read out from the texture buffer 20 (SRAM 17) using the physical address A of the one-dimensional address space shown in FIG. 5, generated based on the aforementioned Expression (1), and the texture data $S17_1$ through $S17_8$ that has been read out is output to the texture α blend circuit 306.

At this time, 16 pixels worth of texture data containing texture data $S17_1$ through $S17_8$ are read out from the banks $220_1$, $220_2$, $221_1$, $221_2$, $222_1$, $222_2$, $223_1$, $223_2$, $224_1$, $224_2$, $225_1$, $225_2$, $226_1$, $226_2$, $227_1$, and $227_2$ making up the SRAM 17, via the wiring group 280, by control of the readout controller 262 shown in FIG. 2.

Next, at the texture α blend circuit 306, the (R, G, B) data $S11b_1$ through $S11b_8$ and the (R, G, B) data contained in the data $S17_1$ through $S17_8$ are blended according a blending value indicated by the tα included in the data $S17_1$ through $S17_8$, thereby generating (R, G, B) data $S306_1$ through $S306_8$.

Then, the α data $S11a_1$, through $S11a_8$ contained in the DDA data and the (R, G, B) data $S306_1$ through $S306_8$ are output to the memory interface circuit 13 as (R, G, B, α) data $S12a_1$ through $S12a_8$, i.e., as pixel data S12a.

Then, in the memory interface circuit 13, the z data corresponding to the pixel data S12a input from the texture engine circuit 12 and the z data stored in the z buffer 22 are compared, and judgement is made whether the image to be drawn by the input pixel data S12a is closer to the viewpoint side than the image previously written to the display buffer 21 or not. In the event that the image to be drawn is closer, the z data stored in the z buffer 22 is updated with the z data corresponding to the image data S12a.

Next, in the memory interface circuit 13, when necessary, the (R, G, B) data contained in the image data S12a is blended with the (R, G, B) data already stored in the display buffer 21 according to a blending value indicated by a data corresponding to the pixel data S12a, and the post-blending (R, G, B) data is written to the display buffer 21.

At this time, 16 pixels worth of (R, G, B) data is written to the banks $210_1$, $210_2$, $211_1$, $211_2$, $212_1$, $212_2$, $213_1$, $213_2$, $214_1$, $214_2$, $215_1$, $215_2$, $216_1$, $216_2$, $217_1$, and $217_2$ making up the display buffer 21 shown in FIG. 1, via the wiring groups 270, 271, 272, and 273 by control of the memory controllers 240, 241, 242, and 243, shown in FIG. 2.

As described above, according to the three-dimensional computer graphics system 1, one-dimensional physical addresses A are generated from two-dimensional texture addresses (U, V) indicating two-dimensional address space of the texture buffer 20, and this physical addresses is used to access the texture buffer 20, so the texture data can be stored in a continuous storage area. Accordingly, available area such as shown in FIG. A1 is not generated, and the storage area of the texture buffer 20 can be efficiently used. Consequently, the storage capacity of the texture buffer 20 can be reduced, leading to reduction in the size of the device and reduction in costs.

Also, according to the three-dimensional computer graphics system 1, two-dimensional texture data such as shown in FIG. 4 is stored in the texture buffer 20 so as to have continuous addresses such as shown in FIG. 5, in units of simultaneously processed unit blocks $R_i$. Also, the pixel data $P_0$ through $P_{15}$ within the unit blocks $R_i$ are stored in mutually differing banks. Consequently, simultaneous access to the pixel data $P_0$ through $P_{15}$ within the unit block $R_i$ stored in the texture buffer 20 is guaranteed.

Second Embodiment

The three-dimensional computer graphics system according to the present embodiment differs from the above-described three-dimensional computer graphics system 1 according to the first embodiment, with regard to the placement of pixels corresponding to simultaneously-accessed pixel data, and the address generating method for generating the one-dimensional physical address A from the texture address (U, V) in the two-dimensional coordinates system. Otherwise, the three-dimensional computer graphics system according to the present embodiment is the same as the three-dimensional computer graphics system 1 according to the first embodiment regarding other configurations.

According to the present embodiment, as shown in FIG. 10, the texture buffer 20 is simultaneously accessed for 16 pixels of pixel data arrayed in a 4-by-4 matrix.

Now, description of the texture data reading process with the three-dimensional computer graphics system according to the present embodiment will be made with reference to FIGS. 8 through 10.

In step S21, the texture data readout circuit 305 first performs computation at the (u, v) calculating circuit 501 to divide the s data by the q data and to divide the t data by the q data for each of the 8 pixels worth of (s, t, q) data S11$a_1$ through S11$a_8$, so as to calculate the division results "s/q" and "t/q".

Then, the division results "s/q" and "t/q" are each multiplied by the texture size USIZE and VSIZE, thereby calculating texture coordinates data $(u_1, v_1)$ through $(u_8, v_8)$ corresponding to each pixel.

In step S22, the (U, V) calculating circuit 502 makes reference to an address table prepared beforehand for example, and obtains a reference address (ubase, vbase) corresponding to the reduction ratio lod.

Then, the (U, V) calculating circuit 502 adds the reference address (ubase, vbase) and the texture coordinates data $(u_1, v_1)$ through $(u_8, v_8)$ input from the (u, v) calculating circuit 501, thereby generating texture addresses $(U_1, V_1)$ through $(U_8, V_8)$ wherein the storage area of the texture buffer 20 is represented by a two-dimensional coordinates system. Also, the texture addresses $(U_9, V_9)$ through $(U_{16}, V_{16})$ for other simultaneously-processed pixel data are generated at a simultaneous or different timing to the generating of the texture addresses $(U_1, V_1)$ through $(U_8, V_8)$.

With the present embodiment, in the event that "i" is an integer that is $1 \leq i \leq 16$, the $U_i$ and $V_i$ of the texture address $(U_i, V_i)$ are respectively comprised of the two bits shown in the following Expressions (2) and (3).

Expression (2)

$$U_i=(U_i[1], U_i[0]) \quad (2)$$

Expression (3)

$$V_i=(V_i[1], V_i[0]) \quad (3)$$

In step S23, the physical address generating circuit 503 joins the bits comprising $U_i$ and $V_i$ with regard to each of the texture addresses $(U_1, V_1)$ through $(U_{16}, V_{16})$ input from the (U, V) calculating circuit 502, according to the pattern shown in the following Expression (4), thereby generating the physical address A. The generation of this physical address A is realized by no more than a simple bit exchanging operation, and thus can be carried out at high speed with a small circuit configuration.

Expression (4)

$$\text{Physical address } A_i=(V_i[1], U_i[1], V_i[0], U_i[0]) \quad (4)$$

The generation of the physical address $A_i$ shown in the above Expression (4) is shown in FIG. 11. In FIG. 11, the vertical axis V represents the value of $V_i$ shown by 2 bits, the horizontal axis U represents the value of $U_i$ shown by 2 bits, and "0" through "15" arrayed in matrix fashion represent the value of the physical address $A_i$.

That is to say, the two-dimensional texture address $(U_i, V_i)$ positioned in a matrix fashion represented by 2-bit $U_i$ and $V_i$, is converted into continuous one-dimensional physical addresses $A_i$ of "0" through "15", by the above Expression (4).

A specific example of conversion with the above Expression (4) will now be given with reference to FIG. 10.

For example, in the event that $U_i=(0, 1)$ and $V_i=(1, 0)$, the physical address A=(1, 0, 0, 1) according to the above Expression (4), which is "9" in a decimal expression. Here, $U_i=(1, 1)=1$, and $V_i=(0, 1)=2$. In FIG. 11, the position A of U=1, V=2 is "9".

Also, in the event that $U_i=(0, 1)$ and $V_i=(0, 1)$, the physical address A=(0, 1, 1, 1) according to the above Expression (4), which is "7" in a decimal expression. Here, $U_i=(1, 1)=3$, and $V_i=(0, 1)=1$. In FIG. 11, the position B of U=1, V=2 is "7".

In step S24, the access control circuit 504 outputs the one-dimensional physical addresses $A_i$ through $A_{16}$ input from the physical address generating circuit 503 to the texture buffer 20 via the memory interface circuit 13 shown in FIG. 1, and reads out the (R, G, B, tα) data $S17_1$ through $S17_8$ which is texture data.

Incidentally, a copy of the texture data stored in the texture buffer 20 is stored in the SRAM 17, so the texture engine circuit 12 actually reads out the texture data stored in the SRAM 17, via the memory interface circuit 13.

In step S25, the access control circuit 504 outputs the (R, G, B, tα) data $S17_1$ through $S17_8$ read out in step S24 to the texture α blend circuit 306.

As described above, the three-dimensional computer graphics system according to the present embodiment has the following advantages, in addition to the advantages of the three-dimensional computer graphics system 1 according to the above-described first embodiment.

That is, according to the three-dimensional computer graphics system of the present embodiment, the one-dimensional physical address A can be generated by combining the bits making up the U and V of the two-dimensional texture address (U, V) representing the two-dimensional address space of the texture buffer 20, based on the above Expression (4). Now, the generation of this physical address $A_i$ is realized by no more than a simple bit exchanging operation, and thus the generation of the physical address $A_i$ can be carried out at high speed with a small circuit configuration.

It should be noted that the present invention is by no means restricted to the above embodiments.

The number of pixels to be simultaneously processed has been described as 8 in the above embodiments, but this number is arbitrary, and may be 4, for example. However, it is preferable that the number of pixels to be simultaneously processed be an exponentiation of the number 2.

Also, the number of pieces of pixel data stored in the DRAM 16 and SRAM 17 and simultaneously accessed has been described as 16 in the above embodiments, but this may be 4, for example, or 64.

Also, though an example has been given of the three-dimensional computer graphics system 1 shown in FIG. 1 using SRAM 17, but a configuration not provided with SRAM 17 may be used instead.

Also, the texture buffer 20 and texture CLUT buffer 23 shown in FIG. 1 may be provided externally from the DRAM 16.

Further, though an example has been given wherein the three-dimensional computer graphics system 1 shown in FIG. 1 performs geometry processing for generating polygon rendering data with a main processor 4, a configuration may be used wherein this is performed is the rendering circuit 5.

As described above, with the storage circuit control device and the method thereof according to the present invention, simultaneous access to multiple pixel data is guaranteed, and also two-dimensional image data can be efficiently stored in the storage circuit. Consequently, the storage area of the storage circuit is efficiently used.

Also, with the graphic computation device and the method thereof according to the present invention, simultaneous access to multiple pixel data making up texture data is guaranteed, and texture data can be efficiently stored in the storage circuit. Consequently, the storage area of the storage circuit is efficiently used.

Also, according to the storage circuit control device and the method thereof and the graphic computation device of the present invention, one-dimensional addresses can be generated by combining the bits making up the two-dimensional address (U, V), so address conversion at the time of accessing the storage circuit can be carried out at high speed.

What is claimed is:

1. A storage circuit control device comprising:
   means for storing in a storage circuit two-dimensional image data including pixel data indicating color of a plurality of pixels arrayed in matrix fashion;
   an address generating means for combining n bits of data making up a U address of a two-dimensional address (U, V) (wherein n is an integer of 1 or greater) and m bits of data making up a V address of said two-dimensional address (U, V) (wherein m is an integer of 1 or greater), to generate an (n+m) bit one-dimensional address; and
   a data accessing means for accessing said storage circuit using said generated one-dimensional address;
   wherein storage to said storage circuit is performed such that unit blocks, including said plurality of pixel data to be simultaneously accessed, are stipulated, and stored in said storage circuit so that a plurality of unit blocks making up said two-dimensional image data are continuously positioned within a one-dimensional address space within said storage circuit and the plurality of pixel data within each of the unit blocks are continuously positioned within the one-dimensional address space;
   wherein in the event that
      said integer n and said integer m are equal;
      and wherein k is an integer expressed by (n−1)<k<0;
      and wherein said U address is represented by the n bits of (U[n−1], . . . , U[k], . . . , U[0]);
      and wherein said V address is represented by the n bits of (V[n−1], . . . , V[k], . . . , V[0]);
   said address generating means combines each of the bit data U[n−1], . . . , U[k], . . . , U[0] of said U address with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

2. A graphic computation device for pasting texture data to a three-dimensional model represented by a combination of a plurality of unit shapes, each unit shape including a plurality of pixels, each pixel having associated rendering data including a set of homogeneous coordinates (s, t) and a homogeneous item q used to simultaneously access a plurality of pixel data making up texture data, said graphic computation device comprising:
   a storage circuit to which storage is performed such that unit blocks, comprising said plurality of pixel data to be simultaneously accessed, are stipulated, and stored so that a plurality of unit blocks making up said texture data are continuously positioned within a one-dimensional address space within said storage circuit;
   a two-dimensional address generating means for generating two-dimensional addresses (U, V) based on results of dividing said homogeneous coordinates (s, t) by said homogeneous item q;
   a one-dimensional address generating means for generating one-dimensional addresses from said two-dimensional addresses (U, V); and
   a data reading means for using said generated one-dimensional addresses to read said texture data from said storage circuit in units of said unit blocks, and perform pasting thereof to said unit shapes.

3. The device of claim 2, wherein said storage circuit has at least a number of banks corresponding to said pixel data to be simultaneously accessed;
   and wherein each piece of said simultaneously-accessed plurality of pixel data included in said unit blocks is stored in mutually differing banks in said storage circuit.

4. The device of claim 2, wherein said simultaneously-accessed plurality of pixel data consists of pixel data for a plurality of pixels arrayed in matrix fashion.

5. The device of claim 2, wherein said one-dimensional address generating means combines n bits of data making up a U address of said two-dimensional address (U, V) (wherein n is an integer of 1 or greater) and m bits of data making up a V address of said two-dimensional address (U, V) (wherein m is an integer of 1 or greater), to generate an (n+m) bit one-dimensional address.

6. The device of clam 5, wherein
   in the event that
      said integer n and said integer m are equal;
      and wherein k is an integer expressed by (n−1)<k<0;
      and wherein said U address is represented by the n bits of (U[n−1], . . . , U[k], . . . , U[0]);
      and wherein said V address is represented by the n bits of (V[n−1], . . . , V[k], . . . , V[0]);
   said one-dimensional address generating means combines each of the bit data U[n−1], . . . , U[k], . . . , U[0] of said U address with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

7. A graphic computation device for pasting texture data to a three-dimensional model represented by a combination of a plurality of unit shapes, each of the unit shapes having associated apexes with associated rendering data used to simultaneously access a plurality of pixel data making up the texture data, said graphic computation device comprising:
   a storage circuit to which storage is performed such that unit blocks, comprising said plurality of pixel data to be simultaneously accessed, are stipulated, and stored so that a plurality of unit blocks making up said texture data are continuously positioned within a one-dimensional address space within said storage circuit;

a polygon rendering data generating means for generating the polygon rendering data for the apexes of said unit shape, the rendering data including data for three-dimensional coordinates (x, y, z), R (red), G (green), B (blue), and homogeneous coordinates (s, t) and homogeneous item q;

an interpolation data generating means for interpolating the polygon rendering data for the apexes of said unit shapes, and generating interpolation data for pixels positioned within said unit shape;

a two-dimensional address generating means for generating two-dimensional addresses (U, V) based on results of dividing said homogeneous coordinates (s, t) included in said interpolation data by said homogeneous item q;

a one-dimensional address generating means for generating one-dimensional addresses from said two-dimensional addresses (U, V); and a data reading means for using said generated one-dimensional addresses to read texture data from said storage circuit in units of said unit blocks, and perform pasting thereof to said unit shapes.

8. The device of claim 7, wherein said storage circuit has at least a number of banks corresponding to said pixel data to be simultaneously accessed;

and wherein each piece of said simultaneously-accessed plurality of pixel data included in said unit blocks is stored in mutually differing banks in said storage circuit.

9. The device of claim 7, wherein said simultaneously-accessed plurality of pixel data consists of pixel data for a plurality of pixels arrayed in matrix fashion.

10. The device of claim 7, wherein said one-dimensional address generating means combines n bits of data making up a U address of said two-dimensional address (U, V) (wherein n is an integer of 1 or greater) and m bits of data making up a V address of said two-dimensional address (U, V) (wherein m is an integer of 1 or greater), so as to generate an (n+m) bit one-dimensional address.

11. The device of claim 10, wherein
in the event that
said integer n and said integer m are equal;
and wherein k is an integer expressed by (n−1)<k<0;
and wherein said U address is represented by the n bits of (U[n−1], . . . , U[k], . . . , U[0];
and wherein said V address is represented by the n bits of (V[n−1], . . . , V[k], . . . , V[0];
said one-dimensional address generating means combines each of the bit data U[n−1], . . . , U[k], . . . , U[0] of said U address with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

12. A graphic computation device for pasting texture data to a three-dimensional model represented by a combination of a plurality of unit shapes, each of the unit shapes having associated apexes with associated rendering data use to simultaneously access a plurality of pixel data making up the texture data said graphic computation device comprising:

a polygon rendering data generating device for generating the polygon rendering data for the apexes of said unit shape, the rendering data including data for three-dimensional coordinates (x, y, z), R (red), G (green), B (blue), and homogeneous coordinates (s, t) and homogeneous item q;

a rendering device for performing rendering processing using said polygon rendering data; and a bus for connecting said polygon rendering data generating device and said rendering device;

wherein said rendering device comprises:
a storage circuit to which storage is performed such that unit blocks, comprising said plurality of pixel data to be simultaneously accessed, are stipulated, and stored so that a plurality of unit blocks making up said texture data are continuously positioned within a one-dimensional address space within said storage circuit;

an interpolation data generating means for interpolating said polygon rendering data input from said polygon rendering data generating device via said bus, and generating interpolation data for pixels positioned within said unit shape;

a two-dimensional address generating means for generating two-dimensional addresses (U, V) based on results of dividing said homogeneous coordinates (s, t) included in said interpolation data by said homogeneous item q;

a one-dimensional address generating means for generating one-dimensional addresses from said two-dimensional addresses (U, V); and a data reading means for using said generated one-dimensional addresses to read texture data from said storage circuit in units of said unit blocks, and perform pasting thereof to said unit shapes.

13. The device of claim 12, wherein said storage circuit has at least a number of banks corresponding to said pixel data to be simultaneously accessed;

and wherein said simultaneously-accessed plurality of pixel data included in said unit blocks is stored in mutually differing banks in said storage circuit.

14. The device of claim 12, wherein said simultaneously-accessed plurality of pixel data consists of pixel data for a plurality of pixels arrayed in matrix fashion.

15. The device of claim 12, wherein said one-dimensional address generating means combines n bits of data making up a U address of said two-dimensional address (U, V) (wherein n is an integer of 1 or greater) and m bits of data making up a V address of said two-dimensional address (U, V) (wherein m is an integer of 1 or greater), to generate an (n+m) bit one-dimensional address.

16. The device of claim 15, wherein
in the event that
said integer and said integer m are equal;
and wherein k is an integer expressed by (n−1)<k<0;
and wherein said U address is represented by the n bits of (U[n−1], . . . , U[k], . . . , U[0];
and wherein said V address is represented by the n bits of (V[n−1], . . . , V[k], . . . , V[0];
said one-dimensional address generating means combines each of the bit data U[n−1], . . . , U[k], . . . , U[0] of said U address with each of the bit data V[n−1], . . . , V[k], . . . , V[0] of said V address thereby generating 2n bits of one-dimensional addresses (V[n−1], U[n−1], . . . , V[k], U[k], . . . , V[0], U[0]).

17. A method for controlling an image data storage circuit comprising:

storing in a storage circuit two-dimensional image data including pixel data indicating color of a plurality of pixels arrayed in matrix fashion;

combining n bits of data making up a U address of a two-dimensional address (U, V) (wherein n is an integer of 1 or greater) and m bits of data making up a V address of a two-dimensional address (U, V) (wherein m is an integer of 1 or greater), so as to generate an (n+m) bit one-dimensional address; and accessing said storage circuit using said generated one-dimensional address;

wherein storage to said storage circuit is performed such that unit blocks, including said plurality of pixel data to be simultaneously accessed, are stipulated, and stored in said storage circuit so that a plurality of unit blocks making up said two-dimensional image data are continuously positioned within a one-dimensional address space within said storage circuit and the plurality of pixel data within each of the unit blocks are continuously positioned within the one-dimensional address space;

wherein in the event that
said integer n and said integer m are equal;
and wherein k is an integer expressed by (n−1)<k<0;
and wherein said U address is represented by the n bits of (U[n−1], . . . , U[k], . . . , U[0]);
and wherein said V address is represented by the n bits of (V[n−1], . . . , V[k], . . . , V[0]);
each of the bit data U[n−1], . . . , U[k], . . . , U[0] of said U address is combined with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

18. A method of pasting texture data to a three-dimensional model represented by a combination of a plurality of unit shapes, each unit shape including a plurality of pixels having associated rendering data including a set of homogeneous coordinates (s, t) and a homogeneous item q used to simultaneously read a plurality of pixel data making up the texture data, said method comprising:

storing in a storage circuit such that unit blocks, comprising said plurality of pixel data, are stipulated, and stored so that a plurality of unit blocks making up said texture data are continuously positioned within a one-dimensional address space within said storage circuit;

generating two-dimensional addresses (U, V) based on results of dividing said homogeneous coordinates (s, t) by said homogeneous item q;

generating one-dimensional addresses from said two-dimensional addresses (U, V); and using said generated one-dimensional addresses to read said texture data from said storage circuit in units of said unit blocks and perform pasting thereof to said unit shapes.

19. A storage circuit control device comprising:

a storage circuit having stored therein two-dimensional image data including pixel data indicating color of a plurality of pixels arrayed in matrix fashion, said pixel data simultaneously accessible using a two-dimensional address (U, V) corresponding to the two-dimensional positioning of said plurality of pixels, wherein storage to said storage circuit is performed such that unit blocks, including said plurality of pixel data to be simultaneously accessed, are stipulated, and stored in said storage circuit so that a plurality of unit blocks making up said two-dimensional image data are continuously positioned within a one-dimensional address space within said storage circuit;

an address generating means for combining n bits of data making up a U address of said two-dimensional address (U, V) (wherein n is an integer of 1 or greater) and m bits of data making up a V address of said two-dimensional address (U, V) (wherein m is an integer of 1 or greater), to generate an (n+m) bit one-dimensional address; and a data accessing means for accessing said storage circuit using said generated one-dimensional address;

wherein when said integer n and said integer m are equal, k is an integer expressed by (n−1)<k<0, said U address is represented by the n bits of (U[n−1], . . . , U[k], . . . , U[0]), and said V address is represented by the n bits of (V[n−1], . . . , V[k], . . . , V[0]), said address generating means combines each of the bit data U[n−1], . . . , U[k], . . . , U[0] of said U address with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

20. A method for storing in a storage circuit two-dimensional image data including pixel data indicating color of a plurality of pixels arrayed in matrix fashion, and simultaneously accessing said pixel data using a two-dimensional address (U, V) corresponding to the two-dimensional positioning of said plurality of pixels, said method comprising:

storing data to said storage circuit such that unit blocks, including said plurality of pixel data to be simultaneously accessed, are stipulated, and stored in said storage circuit so that a plurality of unit blocks making up said two-dimensional image data are continuously positioned within a one-dimensional address space within said storage circuit;

combining n bits of data making up a U address of said two-dimensional address (U, V) (wherein n is an integer of 1 or greater) and m bits of data making up a V address of said two-dimensional address (U, V) (wherein m is an integer of 1 or greater), so as to generate an (n+m) bit one-dimensional address; and accessing said storage circuit using said generated one-dimensional address;

wherein when said integer n and said integer m are equal, k is an integer expressed by (n−1)<k<0, said U address is represented by the n bits of (U[n−1], . . . , U[k], . . . , U[0]), and said V address is represented by the n bits of (V[n−1], . . . , V[k], . . . , V[0]), then each of the bit data U[n−1], . . . , U[k], . . . , U[0] of said U address is combined with each of the bit data V[n−1], . . . , V[k], . . . , V[0] of said V address, thereby generating 2n bits of one-dimensional addresses (V[n−1], U[n−1], . . . , V[k], U[k], . . . , V[0], U[0]).

* * * * *